(12) United States Patent
Kane et al.

(10) Patent No.: US 7,116,687 B2
(45) Date of Patent: Oct. 3, 2006

(54) HIGH REPETITION RATE PASSIVELY Q-SWITCHED LASER FOR BLUE LASER BASED ON INTERACTIONS IN FIBER

(75) Inventors: Thomas J. Kane, Menlo Park, CA (US); Loren A. Eyres, Palo Alto, CA (US); David R. Balsley, San Francisco, CA (US); Gregory L. Keaton, San Francisco, CA (US); James J. Morehead, Oakland, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 205 days.

(21) Appl. No.: 10/662,086

(22) Filed: Sep. 12, 2003

(65) Prior Publication Data

US 2005/0058163 A1   Mar. 17, 2005

(51) Int. Cl.
*H01S 3/10* (2006.01)
(52) U.S. Cl. .................. 372/9; 372/6; 372/41
(58) Field of Classification Search ............ 372/41, 372/9
See application file for complete search history.

(56) References Cited

U.S. PATENT DOCUMENTS

| | | | |
|---|---|---|---|
| 4,708,421 A | 11/1987 | Desruvire et al. ............ 385/30 |
| 4,734,911 A | 3/1988 | Bruesselbach ............... 372/21 |
| 4,796,262 A | 1/1989 | Michelangeli et al. ......... 372/9 |
| 4,815,804 A | 3/1989 | Desruvire .................... 385/27 |
| 4,952,059 A | 8/1990 | Desruvire ................... 356/461 |
| 5,162,940 A | 11/1992 | Brandelik .................. 359/333 |
| 5,200,964 A | 4/1993 | Huber ......................... 372/26 |
| 5,239,408 A | 8/1993 | Hackel et al. ............. 359/338 |
| 5,295,209 A | 3/1994 | Huber ......................... 385/37 |
| 5,388,114 A | 2/1995 | Zarrabi ........................ 372/22 |
| 5,400,165 A | 3/1995 | Gnauck et al. ............. 398/160 |
| 5,434,875 A | 7/1995 | Rieger et al. ................. 372/25 |
| 5,461,637 A | 10/1995 | Mooradian et al. ........... 372/92 |
| 5,491,707 A | 2/1996 | Rieger et al. ................. 372/25 |
| 5,511,085 A | 4/1996 | Marshall ...................... 372/22 |

(Continued)

OTHER PUBLICATIONS

Fabio Di Teodoro, Jeffrey P. Koplow, Sean W. Moore and Dahv A. V. Kliner, "Diffraction-limited 300-kW peak-power pulses from a coiled multimode fiber amplifier," *Optics Letters*, vol. 27, No. 7, Apr. 1, 2002.

(Continued)

*Primary Examiner*—Minsun Oh Harvey
*Assistant Examiner*—Tod T. Van Roy
(74) *Attorney, Agent, or Firm*—Allen, Dyer, Doppelt, Milbrath & Gilchrist, P.A.

(57) ABSTRACT

A laser apparatus is disclosed. The apparatus includes a Neodymium-doped lasing material having first and second surfaces and a passive Q-switch optically coupled to the second surface. The first-surface is substantially transparent to a pump radiation and substantially reflective to laser radiation generated by an interaction between the pump radiation and the Neodymium-doped lasing material. The laser radiation is characterized by a vacuum wavelength corresponding to an atomic transition from the $^4F_{3/2}$ level to the $^4I_{9/2}$ level of Neodymium in the lasing material. The second surface transmits at least a portion of the laser radiation. The lasing material and Q-switch are configured to produce pulses of the laser radiation characterized by a pulse length of greater than zero and less than about 1.5 nanoseconds and a pulse repetition rate greater than about 100 kHz. A PQSL laser, an apparatus for generating blue light and a display system based on the laser apparatus are also disclosed.

20 Claims, 12 Drawing Sheets

U.S. PATENT DOCUMENTS

| | | | | |
|---|---|---|---|---|
| 5,539,765 | A | 7/1996 | Sibbett et al. | 372/92 |
| 5,541,947 | A | 7/1996 | Mourou et al. | 372/25 |
| 5,627,853 | A | 5/1997 | Mooradian et al. | 372/92 |
| 5,648,976 | A | 7/1997 | Franck et al. | 372/25 |
| 5,675,596 | A | 10/1997 | Kong et al. | 372/25 |
| 5,680,412 | A | 10/1997 | DeMaria et al. | 372/92 |
| 5,689,363 | A | 11/1997 | Dane et al. | 359/335 |
| 5,740,190 | A * | 4/1998 | Moulton | 372/23 |
| 5,751,751 | A | 5/1998 | Hargis et al. | 372/41 |
| 5,761,227 | A * | 6/1998 | Hargis et al. | 372/22 |
| 5,768,302 | A | 6/1998 | Wallace et al. | 372/21 |
| 5,790,574 | A | 8/1998 | Rieger et al. | 372/25 |
| 5,790,584 | A | 8/1998 | Kong et al. | 372/98 |
| 5,825,465 | A | 10/1998 | Nerin et al. | 356/28.5 |
| 5,889,798 | A | 3/1999 | Molva et al. | 372/12 |
| 5,920,588 | A | 7/1999 | Watanabe | 372/96 |
| 5,982,482 | A | 11/1999 | Nelson et al. | 356/237.1 |
| 5,982,789 | A | 11/1999 | Marshall et al. | 372/22 |
| 5,986,234 | A | 11/1999 | Matthews et al. | 219/121.68 |
| 6,026,102 | A | 2/2000 | Shimoji | 372/22 |
| 6,061,378 | A | 5/2000 | Marshall et al. | 372/75 |
| 6,096,496 | A | 8/2000 | Frankel | 435/4 |
| 6,100,516 | A | 8/2000 | Nerin et al. | 250/206.2 |
| 6,141,143 | A | 10/2000 | Marshall | 359/342 |
| 6,144,484 | A | 11/2000 | Marshall | 359/333 |
| 6,195,369 | B1 | 2/2001 | Kumar et al. | 372/26 |
| 6,208,458 | B1 | 3/2001 | Galvanauskas et al. | 359/345 |
| 6,301,275 | B1 | 10/2001 | Eichenholz et al. | 372/22 |
| 6,307,984 | B1 | 10/2001 | Watanabe | 385/24 |
| 6,356,578 | B1 * | 3/2002 | Yin | 372/107 |
| 6,393,035 | B1 | 5/2002 | Weingarten et al. | 372/18 |
| 6,424,773 | B1 | 7/2002 | Watanabe | 385/122 |
| 6,445,494 | B1 | 9/2002 | Nilsson et al. | 359/341.1 |
| 6,449,408 | B1 | 9/2002 | Evans et al. | 385/27 |
| 6,504,972 | B1 | 1/2003 | Watanabe | 385/24 |
| 6,506,342 | B1 | 1/2003 | Frankel | 422/63 |
| 6,542,228 | B1 | 4/2003 | Hartog | 356/73.1 |
| 6,563,995 | B1 | 5/2003 | Keaton et al. | 385/127 |
| 6,577,429 | B1 | 6/2003 | Kurtz et al. | 359/279 |
| 6,614,815 | B1 | 9/2003 | Kane et al. | 372/6 |
| 6,614,975 | B1 | 9/2003 | Richardson et al. | 385/127 |
| 6,735,234 | B1 * | 5/2004 | Paschotta et al. | 372/75 |
| 6,778,565 | B1 | 8/2004 | Spuehler et al. | 372/25 |
| 6,826,219 | B1 * | 11/2004 | Weingarten et al. | 372/49.01 |
| 2001/0017724 | A1 | 8/2001 | Miyamoto et al. | 398/135 |
| 2001/0021288 | A1 | 9/2001 | Watanabe | 385/15 |
| 2001/0053263 | A1 | 12/2001 | Watanabe | 385/24 |
| 2002/0136246 | A1 | 9/2002 | Kubota et al. | 372/21 |
| 2003/0030756 | A1 | 2/2003 | Kane et al. | 348/744 |
| 2003/0031215 | A1 | 2/2003 | Kane et al. | 372/10 |
| 2003/0031411 | A1 | 2/2003 | Arbore et al. | 385/37 |
| 2003/0035618 | A1 | 2/2003 | Sasaki et al. | 385/24 |
| 2003/0058904 | A1 | 3/2003 | Krainer et al. | 375/25 |
| 2003/0063860 | A1 | 4/2003 | Watanabe | 385/39 |
| 2003/0063884 | A1 | 4/2003 | Smith et al. | 385/129 |
| 2003/0118060 | A1 * | 6/2003 | Spuehler et al. | 372/18 |

OTHER PUBLICATIONS

Dahv A. V. Kliner Fabio Di Teodoro, Jeffrey P. Koplow, and Sean W. Moore, "Efficient UV and visible generation using a pulsed, Yb-doped fiber amplifier," presented at Conference of Lasers and Electro-Optics, May 23, 2002.

G. J. Spuhler, R. Paschotta, R. Fluck, B. Braun, M. Moser, G. Zhang, E. Gini and U. Keller, "Experimentally confirmed design guidelines for passively Q-switched microchip lasers using semiconductor saturable absorbers," Journal of the Optical Society of America B, vol. 16, No. 4, Mar. 1999.

Govind P. Agrawal, *Nonlinear Fiber Optics, Third Edition*, Chapter 9, Stimulated Brillouin Scattering, pp. 355-388, Academic Press, San Diego, California, 2001.

R. Selvas, J. K. Sahu, L. B. Fu, J. N. Jang, J. Nilsson, A. B. Grudinin, K. H. Yla-Jarkko, S. A., Alam, P. W. Turner and J. Moore, "High-power, low-noise, Yb-doped, cladding-pumped, three-level fiber sources at 980 nm," *Optics Letters*, vol. 28, No. 13, Jul. 1, 2003.

* cited by examiner

HIGH REPETITION RATE PASSIVELY Q-SWITCHED LASER FOR BLUE LASER BASED ON INTERACTIONS IN FIBER

GOVERNMENT RIGHTS IN THE INVENTION

This invention was made under contract # F29601-01-C-0246 of the United States Air Force. The government has certain rights in this invention.

CROSS REFERENCE TO A RELATED APPLICATION

This application is related to commonly-assigned U.S. patent application Ser. No. 10/662,097 to Thomas J. Kane, Gregory L. Keaton and James Morehead entitled "FIBER AMPLIFIER SYSTEM FOR PRODUCING VISIBLE LIGHT," which is filed concurrently herewith and the disclosures of which are incorporated herein by reference.

FIELD OF THE INVENTION

This invention relates generally to nonlinear optics. More particularly, it relates to generation of infrared light suitable for conversion to blue light for three-color laser light sources.

BACKGROUND OF THE INVENTION

Color display systems often rely on three separate sources to produce three primary colors of light. The intensities of the three primary colors can then be varied and mixed to produce various different colors in a color image. The eye's perception of color is related to the response of three different types of cells in the retina. Each type of cell responds to a different portion of the electromagnetic spectrum.

For the specific purpose of display or projection systems the best wavelength for "blue" light is about 450 nm (in vacuum). Such light is actually perceived by the human eye as a purplish-blue color as opposed to a pure blue. "Pure" blue light is typically characterized by a wavelength in the range of about 460 nm to about 480 nm. The reason for using 450 nm can be explained using the chromaticity diagram of FIG. 1. Given three colors that can be located on the chromaticity diagram, it is only possible to create by addition colors which are on the interior of a triangle created by placing corner points at the three colors. It is clear from FIG. 1 that a wavelength of 450 nm is ideal. A display system based on a wavelength of 470 nm would create a situation where a number of well saturated purples and red-purples are outside the triangle and, thus, not accessible to the display system.

A single laser which has output at the three colors of red, green and blue would be valuable for projection displays. Development of such lasers has been hampered by difficulties in producing blue light at sufficient power levels for use in a display. One current approach to generating high power levels of blue light is to use Nd:YAG lasers operating at 1064 nm. The output of the laser is frequency doubled with a nonlinear crystal to 532 nm. The frequency-doubled output then pumps an OPO. One of the OPO output wavelengths is then summed with the 532-nm light to create the blue. Thus 2 nonlinear steps in 2 separate crystals are required to produce blue light from infrared laser light. Since each step requires crystals, and has limited efficiency, the overall system is expensive and inefficient. Furthermore, Nd:YAG lasers require water-cooling and resonator structures, which add to the complexity, bulk and cost of the system.

For such lasers, and a number of other applications, it is desirable to have a single-frequency, pulsed laser source at an infrared wavelength suitable for conversion to blue light. High repetition rates are often needed, e.g., in image display systems because the time between pulses must be smaller than the duration of a modulation state of the light modulator that produces the image. For example, if the display presents data one pixel at a time, and if there are 1 million pixels, with an image refresh rate of 30 Hz, then a repetition rate of greater than 30 MHz is needed to avoid a situation where there is less than one pulse per pixel. If the display presents data one column of pixels at a time, then the laser repetition rate can be about 1000 times slower, or about 30 kHz, since the column of pixels contains 1000 pixels. However, even for systems where one column of pixels is presented at a time, it is desirable to have the pulse repetition rate greater than 1 MHz, so that very large pixel counts can be used at high refresh rates, and so that there are no pattern artifacts due to some pixel columns receiving more pulses of light than others.

Furthermore, a single frequency of oscillation for the infrared radiation is desirable so that conversion of the infrared light to blue light is efficient. If multiple frequencies are present, it may not be possible to optimize the frequency converter for each infrared frequency, and efficiency is reduced.

There is a need, therefore, for compact, efficient and inexpensive blue lasers, displays that use such lasers, and sources or methods of producing pulsed infrared light for use in such lasers.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. In the mathematical derivations described below certain assumptions have been made for the sake of clarity. These assumptions should not be construed as limitations on the invention. Accordingly, the exemplary embodiments of the invention described below are set forth without any loss of generality to, and without imposing limitations upon, the claimed invention.

In the discussion that follows, the word "a" may be taken to mean "one or more," unless specifically stated otherwise. For the purposes of the following discussion, "blue light" generally refers to electromagnetic radiation having a frequency of between about $6.7 \times 10^{14}$ Hz and $6.3 \times 10^{14}$ Hz (about 430 to 480 nm wavelength in vacuum). "Green light" refers to radiation having a frequency of between about $5.9 \times 10^{14}$ Hz and $5.5 \times 10^{14}$ Hz (about 510 to 550 nm wavelength in vacuum). "Red light" refers to radiation having a frequency of between about $4.8 \times 10^{14}$ Hz and $4.2 \times 10^{14}$ Hz (about 620 to 720 nm wavelength in vacuum).

1. Blue Laser

Figure 1:
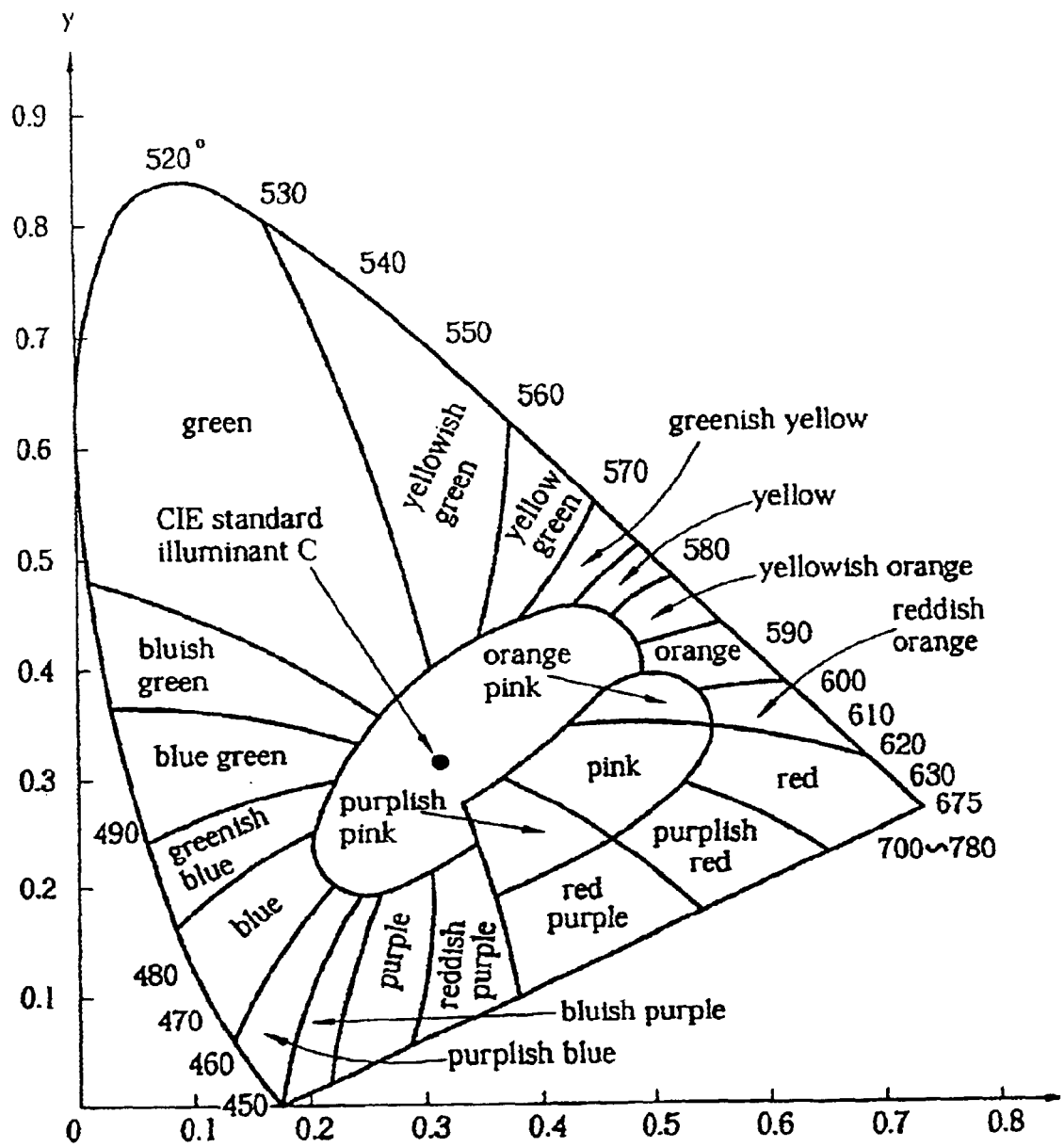
FIG. 1 depicts a chromaticity diagram, depicting color location.
Figure 2A:
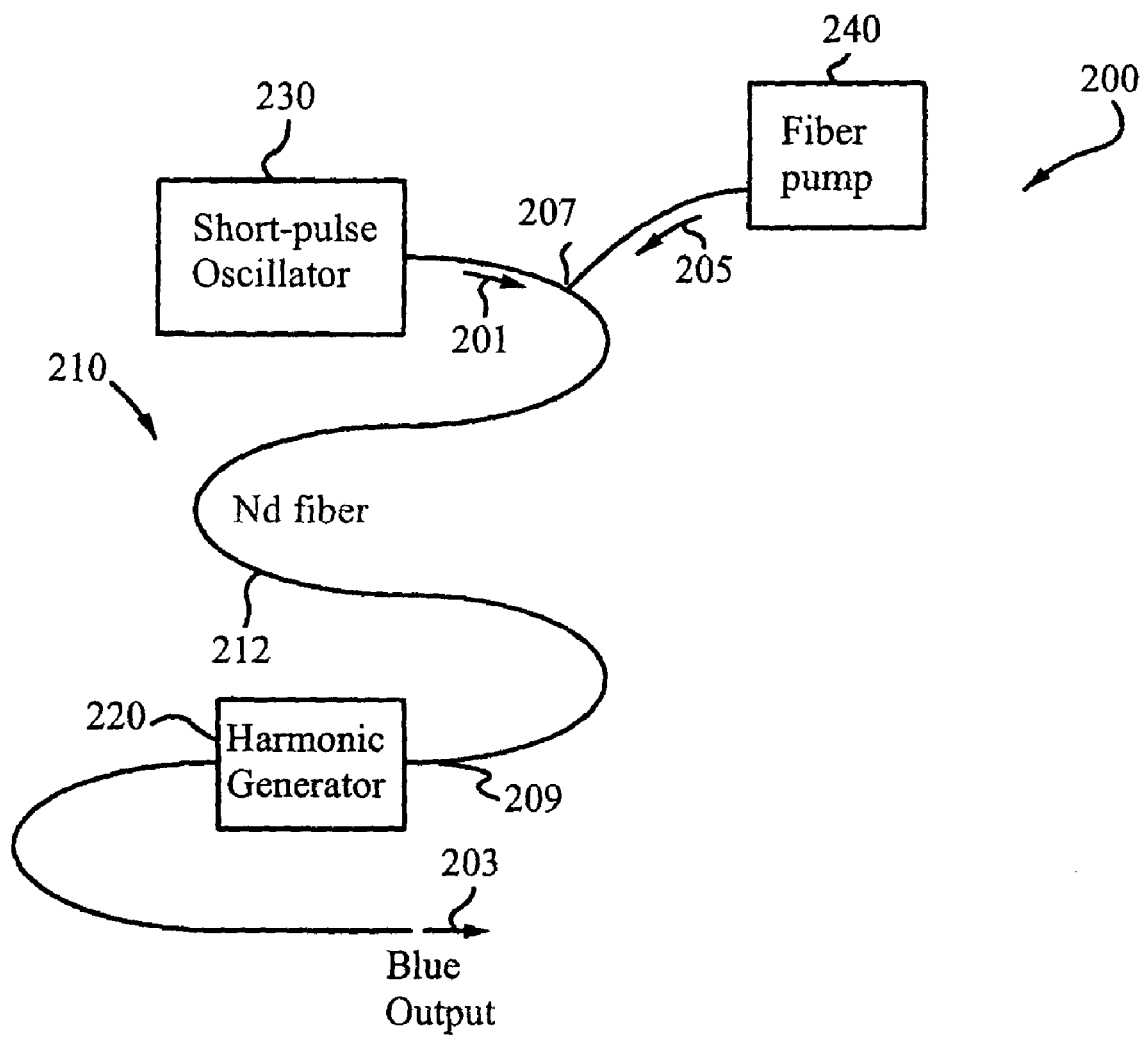
FIG. 2A depicts a simplified schematic diagram of a blue laser according to a first embodiment of the present invention.

FIG. 2A depicts a simplified schematic diagram of a blue laser apparatus according to a first embodiment of the present invention. The laser 200 generally comprises a Neodymium-doped cladding-pumped light-generating fiber device optically coupled to a harmonic generator 220. The fiber device may include a fiber oscillator, a fiber amplifier or both. The harmonic generator 220 generates a second or higher order harmonic of a source radiation 201 from the fiber device. The second or higher order harmonic is characterized by a wavelength in vacuum corresponding to the color blue and is referred to as blue output radiation 203.

In a specific embodiment, the fiber device comprises a fiber amplifier 210. The fiber amplifier 210 receives optical power in the form of source radiation 201 from an oscillator 230. The fiber amplifier 210 amplifies the optical power from the oscillator 230 to a level on the order of 1 watt or greater. The harmonic generator 220 may, for example, be a second-harmonic generator that doubles the frequency of the output of the amplifier 210 to produce blue output radiation 203. For projection or display applications, the blue radiation is preferably characterized by a wavelength in vacuum of between about 440 nm and about 460 nm. For example, a fiber amplifier 210 doped with Neodymium will preferentially amplify radiation at a half harmonic of blue (0.91÷2=0.455 microns). Alternatively, harmonic generator 220 may generate higher order harmonics of the source radiation 201 such as third-harmonics, etc. to produce blue radiation.

Figure 2B:
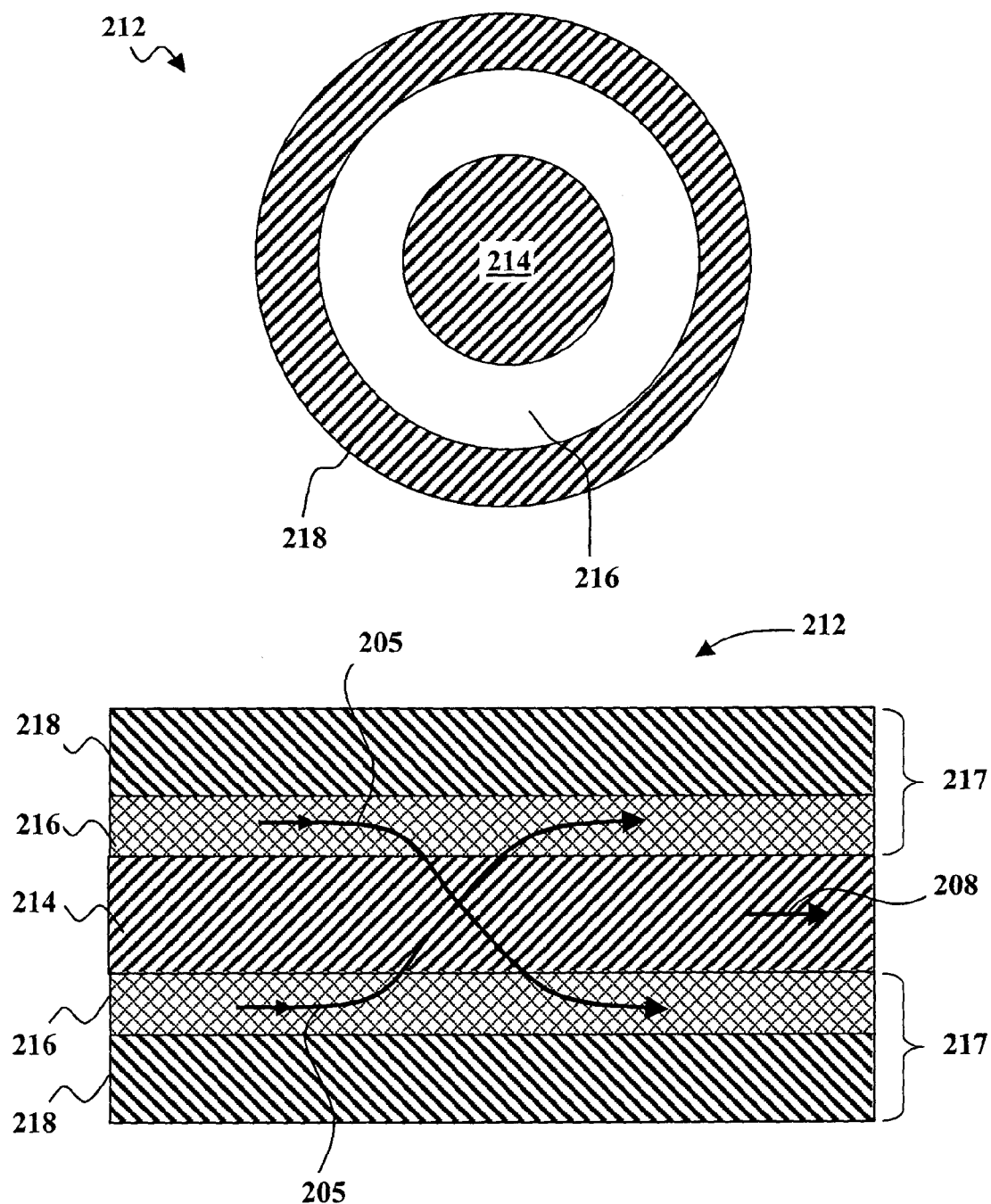
FIG. 2B depicts cross sectional schematic diagram of a fiber used in the laser of FIG. 2A.

The fiber amplifier 210 generally comprises an optical fiber 212 having a core 214 made of Neodymium doped glass. FIG. 2B depicts cross sectional schematic diagrams of the optical fiber 212. The fiber 212 generally comprises the core 214 surrounded by a cladding 217 including inner and outer cladding layers 216 and 218 respectively. The cladding layer 216 is optically coupled to a pump source 240. The pump source 240 may comprise one or more high-power pump diodes, for example, at a wavelength near 0.80 microns. Because of the three-level nature of the transition in Nd:Glass, the pump source 240 preferably produces pumping radiation 205 having an intensity that is a substantial fraction of a saturation intensity of the pumped transition, e.g. about 500 Watts/mm$^2$. Such a pump source 240 is generally referred to herein as a high-brightness pump source.

To amplify the source radiation 201, a technique commonly referred to as "cladding pumping" may be used. In a cladding pump technique, core 214 is preferably a single-mode core surrounded by a multi-mode inner cladding layer 216 which, in turn, is surrounded by outer cladding layer 218. The core 214 is typically doped with Neodymium (Nd). A relatively high-power multimode pumping radiation signal 205 launched into the cladding 217 from the pump source is substantially confined and guided within the multi-mode cladding layer. Pumping radiation 205 propagates along the multi-mode inner cladding layer 216 criss-crossing the core 214. The Nd doped core 214 absorbs energy from the pumping radiation 205. The absorbed energy is converted into laser output radiation 208 within the core.

Neodymium glass is known to have gain at a wavelength of 0.91 microns, but its gain at 1.05 microns is higher. A similar situation exists in Nd:YAG laser crystals, where gain is higher at 1.06 microns than at 0.946 microns. It is desirable to suppress the gain at 1.05 and 1.06 microns because the second harmonics of 1.05-micron and 1.06-micron radiation, i.e. 525-nm and 530-nm radiation respectively, are not blue. Gain-suppression means at wavelengths having second harmonics that are not blue may be necessary, to keep parasitic oscillation at these wavelengths from extracting all the power from the amplifier 210.

In view of the above, two conditions are desirable for efficient operation using the short-wavelength, e.g. 0.91 micron transition of Nd:glass. A first condition is for fiber 212 to have a distributed loss means that attenuates the 1.05 micron radiation from the high gain, undesired, long-wavelength transition much more than they attenuate the radiation from the desired, short wavelength transition. A second condition is that the intensity of the pumping radiation 205 at a wavelength near 800 nm be relatively high. For acceptable efficiency using the short-wavelength transition of Nd:glass fibers the pump intensity preferably remains above 50 Watts/mm$^2$ along substantially the entire length of the fiber. Since the power in the fiber is absorbed exponentially, and typically absorption near 90% is desired for good efficiency, the power of pumping radiation is preferably about 500 Watts/mm$^2$ or greater at a fiber entrance 207 if the pump radiation 205 passes once through the fiber 212. The minimum required pump intensity may be reduced to about 250 Watts/mm$^2$ if the pump radiation 205 exiting at a far end 209 of the fiber 212 is retroreflected so that it returns to the fiber 212. The intensity of pump radiation 205 may also be reduced if, for example, identical pumps are used at both ends of the fiber 212. Generally, the pump sources e.g. pump source 240, produce sufficient pump power that pump radiation 205 has an intensity of 50 Watts/mm² or greater inside the fiber 212 and an intensity greater than or equal to 100 Watts/mm² at the entrance to the fiber 212.

Pumping intensities at levels greater than or equal to about 100 Watts/mm² have only recently become available. One pump source commonly used for diode pumping is an SDL-3460-P6 diode from SDL of San Jose, Calif. This pump source provides 16 Watts of power from a 0.6 mm diameter aperture. The pump intensity, i.e. the power divided by the aperture area is equal to about 57 Watts/mm². This is generally inadequate for pumping the short wavelength transition of Nd:glass fiber, even with double ended pumping and suppression of the 1.05 micron transition. A newer design of fiber pump is available from LIMO of Dortmund, Germany. This diode source has a power of about 25 Watts from a 0.2 mm diameter fiber. The corresponding intensity is about 795 Watts/mm². This is more than adequate to pump the short-wavelength transition of Nd:glass, even with single-ended pumping.

In lasers using the short wavelength transition of Nd:Glass (e.g. 910 nm) there is a tradeoff between wavelength and pump intensity. In a 3-level transition with a significant wavelength breadth, such as the short wavelength transition of Nd:Glass, shorter wavelengths require a more intense pump source to achieve gain because a greater fraction of the atoms must be inverted to achieve gain. At very low pump intensities, e.g. 50 Watts/mm² or less, gain is possible only at wavelengths longer than 920 nm. Achieving gain in the range between 900 nm and 920 nm typically requires pumping intensities of about 100 Watts/mm² or more. Even shorter wavelengths can be obtained with still higher pump intensities.

As stated above, it is often useful and sometimes necessary to suppress the gain of an undesired long wavelength transition in a fiber device. One way to suppress gain at undesired wavelengths is through dopants disposed in the cladding 217. For example, the cladding 217 may include dopants that absorb radiation emitted by a $^4F_{3/2}$ to $^4I_{11/2}$ atomic transition corresponding to a wavelength in vacuum of 1.05 microns for Neodymium glass and 1.06 microns for Nd:YAG. Preferably, the dopants are also transparent to radiation emitted by a $^4F_{3/2}$ to $^4I_{9/2}$ atomic transition corresponding to 0.91 microns in Neodymium glass and 0.946 microns in Nd:YAG. Such dopants include ions such as $Yb^{3+}$, $Dy^{3+}$, $Pr^{3+}$, $Tm^{2+}$ and $Sm^{3+}$ and $V^{3+}$.

Alternatively, gain at undesired wavelengths may be suppressed by means of gratings or mirrors. For example, fiber 212 may have an index of refraction n that varies periodically along its length to form gratings. By suitably varying the index of the fiber 212 the gratings can reflect certain wavelengths of light out of the fiber while transmitting others. In fiber gratings maxima in n are typically separated by a distance of approximately one-half the wavelength of undesired light in the fiber. The gratings are usually aligned at a non-normal incidence with respect to the fiber axis. Such gratings reject the undesired wavelengths from the core 214 of fiber 212. Fiber 212 may also include dichroic mirrors coupled to the ends of the fibers. The mirrors transmit wavelengths in an undesired range, e.g. 1.05 microns, while reflecting other wavelengths, e.g. 0.91 microns back into the fiber.

Figure 3A:
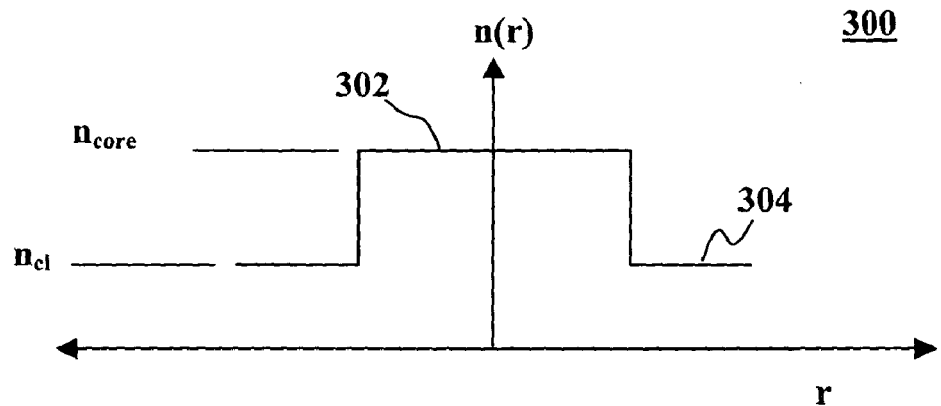
FIG. 3A depicts a refractive index profile of a conventional fiber.
Figure 3B:
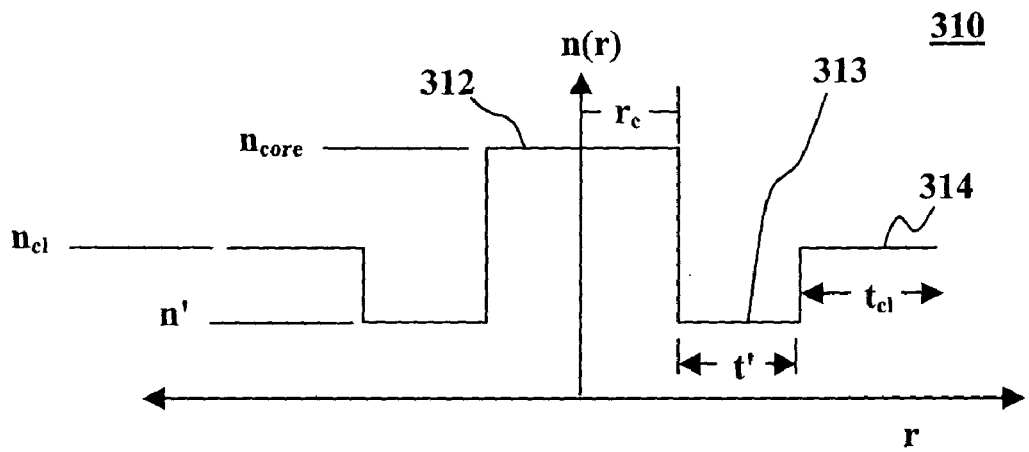
FIGS. 3B–3C depict refractive index profiles for rejecting undesired wavelengths from the core of a fiber according to an embodiment of the present invention.
Figure 3C:
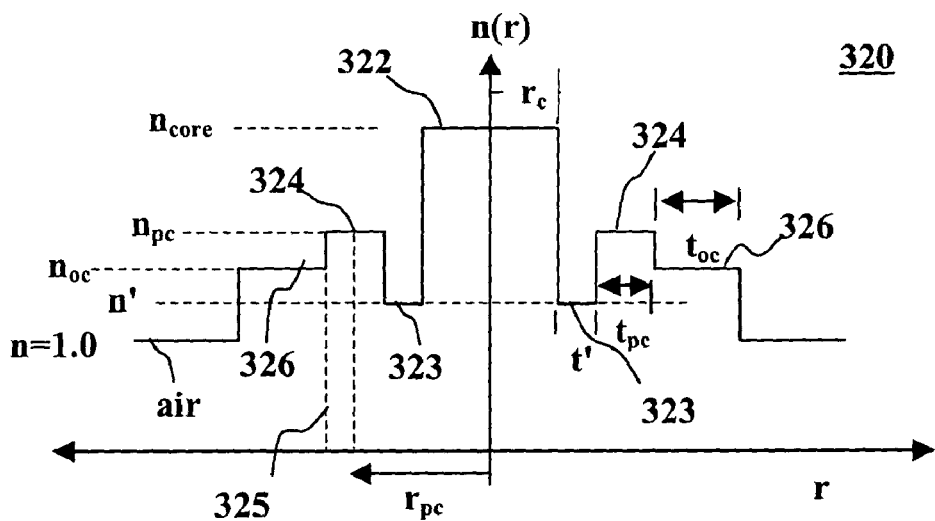

A first alternative method for suppressing undesired wavelengths is depicted in FIGS. 3A–3C. The alternative method for suppressing the undesired wavelength is based on the observation that a typical fiber core surrounded by a cladding always has at least one bound mode at any wavelength. FIG. 3A depicts a graph 300 of refractive index n versus radial distance r from the center of a typical optical fiber. The core region 302 typically has a higher refractive index than the cladding region 304. Total internal reflection takes place at the interface 306 between the core region 302 and the cladding region 304. However, if the narrow region of lower refractive index than the cladding region 304 surrounds the core region 302 light may tunnel out of the core region 302. It is possible in such a situation that light at certain wavelengths will have no bound modes. The situation is depicted schematically in the graph 310 of FIG. 3B. In FIG. 3B, a fiber has a core region 312 surrounded by a tunnel cladding region 313. A cladding region 314 surrounds the tunnel cladding 313 and core regions 312. The core is characterized by a refractive index $n_{core}$ and a radius $r_e$. The cladding region 314 is characterized by a refractive index $n_{cl}$ and a thickness $t_{cl}$. The tunnel cladding region 313 is characterized by a refractive index n' and a thickness t'. Generally, $n'<n_{cl}n_{core}$. Such a refractive index profile is sometimes referred to as a "W" profile. The propagation of radiation in fibers having such profiles is described in detail by Michael Monerie in "Propagation in Doubly Clad Single-Mode Fibers", IEEE Journal of Quantum Electronics QE-18 (1982) p. 525, which is incorporated herein by reference, and references therein. If the values of $n_{core}$, $n_{cl}$, n', $r_c$, $t_{cl}$ and t' are chosen such that an average squared index of refraction $<n^2(r)><n_{cl}^2$, then there exists a cutoff wavelength $\lambda_c$ for which light having wavelengths (in vacuum) greater than $\lambda_c$ will have no bound modes. Undesired wavelengths above $\lambda_c$ will be scattered out of the fiber along its length while bound modes of desirable wavelengths below $\lambda_c$ are retained in the fiber. Generally the tunnel cladding region 313 is thick enough that $<n^2(r)><n_{cl}^2$ but thin enough to provide efficient tunneling of the undesired wavelengths. Thus, by properly engineering the refractive index profile of a fiber, it is possible to have a "W" profile wherein 0.91 µm<$\lambda_c$<1.05 µm. For such a fiber, light of wavelength 1.05 µm will not have a bound mode and will pass out of the fiber along its length. Light of wavelength 0.91 µm will have a bound mode that will be contained by the fiber. The overall effect is to reject the undesired 1.05 µm radiation while retaining the desired 0.91 µm radiation.

A specific embodiment of a practical application of this principle utilizes a triply clad fiber illustrated by the refractive index profile 320 of FIG. 3C. The fiber generally comprises, as shown in FIGS. 3C and 3D, a core region 322 surrounded by a tunnel cladding region 323. A pump cladding region 324 surrounds the core 322 and tunnel cladding 323 regions. An outer cladding region 326 surrounds the core 322, tunnel cladding 323, and pump cladding 324 regions. The core is characterized by a refractive index $n_{core}$ and a radius $r_c$. The tunnel cladding region 323 is characterized by a refractive index n' and a thickness t'. The pump cladding region 324 is characterized by a refractive index $n_{pc}$ and a thickness $t_{pc}$. The outer cladding is characterized by an index of refraction $n_{oc}$ and a thickness $t_{oc}$. The outer cladding may be surrounded by air having an index of refraction of about 1.0. Generally, $n'<n_{pc}<n_{core}$ and $n_{oc}<n_{pc}$. Such a configuration allows the undesired radiation to tunnel out of the core region 322. Total internal reflection at an interface 325 between the pump cladding 324 and outer cladding 326 provides a bound mode that confines the pumping radiation for efficient pumping of the core region 322.

Here, $\langle n^2(r) \rangle$ is defined as:

$$\langle n^2(r) \rangle = \frac{1}{A} \int_0^{r_{pc}} r\, dr\, d\theta\, n^2(r)$$

where $r_{pc}$ represents some distance from the axis of the fiber that lies within the pump cladding and A represents a cross sectional area of the fiber within $r_{pc}$ of the axis. For example, if the fiber has a circular cross section, $A = \pi r_{pc}^2$. The radius $r_{pc}$ is typically greater than a few undesired wavelengths.

Figure 4A:
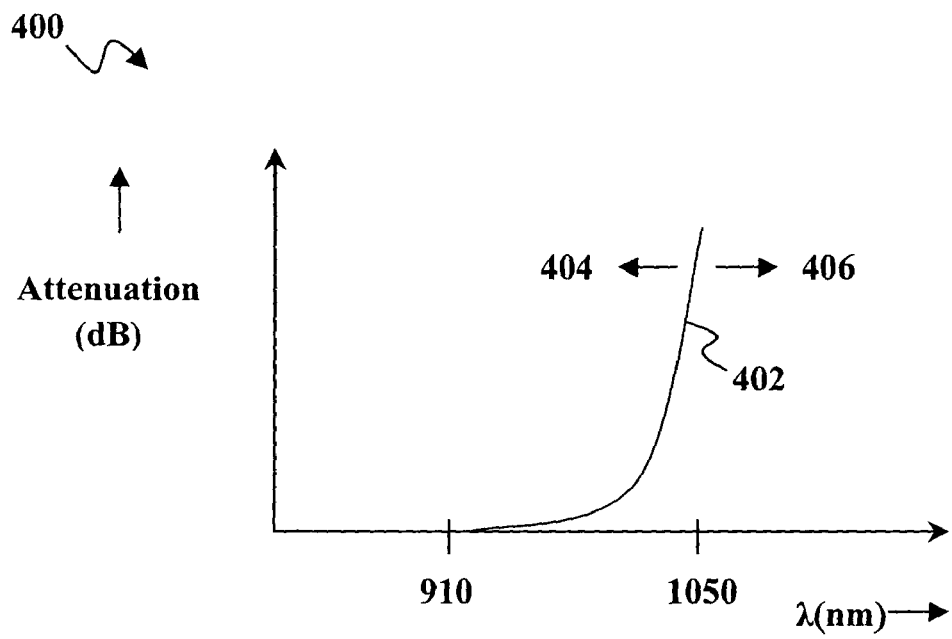
FIG. 4A depicts attenuation versus wavelength for a coiled fiber.
Figure 4B:
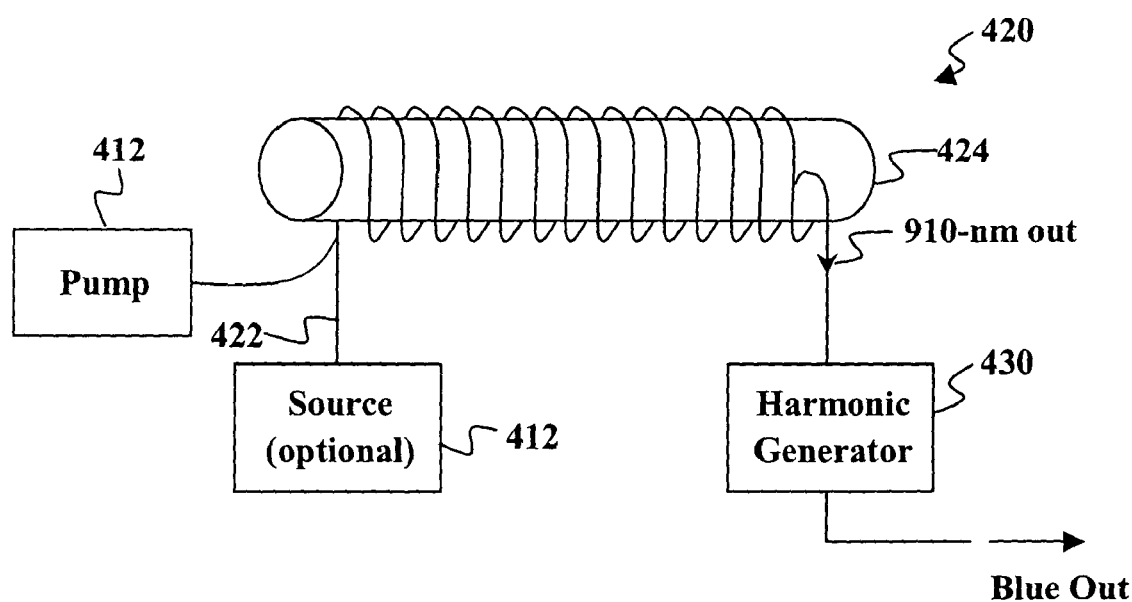
FIG. 4B depicts an embodiment of a blue laser source incorporating a coiled fiber to suppress gain at an undesired wavelength.

A second alternative method for suppressing undesired wavelengths is described with respect to FIGS. 4A–4B. The second alternative method relies on the fact that coiling a fiber produces wavelength dependent losses. FIG. 4A depicts a graph 400 of attenuation versus wavelength λ for a coiled fiber. Here attenuation is measured in dB. The attenuation rises abruptly as wavelength increases. The abrupt rise 402 in the attenuation curve effectively divides the wavelength axis into a weakly attenuated region 404 and a strongly attenuated region 406. It turns out that the location of the abrupt rise 402 and, hence, the boundary between the weakly and strongly attenuated regions depends on the bend radius of the coiled fiber. Therefore, by properly bending a coiled fiber, the fiber may attenuate undesired long wavelengths but not desired shorter wavelengths. For example, by appropriate choice of bend radius, a coiled fiber may be engineered to attenuate 1050 nm (i.e. 1.05 micron) radiation but not 910 nm (i.e. 0.91 micron) radiation.

FIG. 4B depicts an exemplary embodiment of a blue laser apparatus incorporating a coiled fiber to suppress optical gain at an undesired wavelength. The apparatus generally comprises a cladding-pumped fiber device 420. The fiber device 420 generally comprises an optical fiber 422 coiled around a mandrel of radius R. The radius of the mandrel 424 determines a bend radius of the fiber 422 for suppression of gain at an undesired wavelength, e.g. 1050 nm, as described above. For gain suppression in the infrared, R is typically of order 10 mm. Attenuation of radiation by bending optical fibers is discussed in detail by Sakai et al. in Applied Optics 17 (1978) p. 1499, which is incorporated herein by reference. A pump 410 provides pump radiation for the fiber device 420. The pump 410 is optically coupled to a cladding of the fiber 422 to provide pumping as described above with respect to FIG. 2B. An optional source 412 provides radiation to a core of the fiber 422. The fiber device 420 may be coupled to a harmonic generator 430 to produce blue radiation, e.g., by doubling 910 nm infrared radiation.

Both of the alternative methods for suppressing gain at an undesired wavelength rely on the fact the gain suppression effect occurs for wavelengths that are longer than the desired wavelength. Furthermore, those skilled in the art will recognize that it is possible to combine the tunnel cladding approach of FIGS. 3B–3C with the bending approach of FIG. 4 to provide a means for rejecting undesired wavelengths while retaining others.

Returning to FIG. 2A, the harmonic generator 220 typically comprises a non-linear crystal including a material such as Lithium Niobate ($LiNbO_3$), Lithium Tantalate ($LiTaO_3$), Lithium Borate ($LiBO_3$), Potassium Niobate, periodically poled lithium niobate (PPLN), periodically poled lithium tantalate (PPLT) MgO:PPLN, KTP, PPKTP, RTA, BBO, or PPRTA. The harmonic generator 220 may be a second-harmonic generator that interacts with two photons of the source radiation 201 to produce a single photon of output radiation 203. For example, if the source radiation 201 has a wavelength of 910 nm, the output radiation 203 will have a wavelength of 455 nm, which the eye senses as blue. For second-harmonic generation, a given piece of non-linear crystal has a characteristic frequency-doubling coefficient in units of % per Watt of input power. Generally, the higher the input power, the higher the conversion efficiency. The power of output radiation 203 goes as the square of the power of input source radiation 201 up to a point were the input is significantly depleted. The crystalline axes of the material comprising second-harmonic generator 220 must be in the right orientation, the crystal must be at the right temperature, the crystal must not damage under high input power. Other considerations constrain the choice of doubling crystals, however these are well known in the art. Those of skill in the art will recognize that non-linear crystals may also be used as third-harmonic generators to triple the frequency of source radiation 201, or as higher order harmonic generators.

There are a number of options and constraints when the fiber device includes a fiber amplifier, such as fiber amplifier 210 and the amplifier is coupled to an oscillator, such as oscillator 230. One constraint is that the oscillator must provide source radiation 201 at the correct wavelength because the amplifier 210 generally does not shift wavelengths. Another constraint is that the average power of the radiation coupled into the amplifier 210 is preferably on the order of 10 mW or greater so that the amplifier 210 operates stably and with low noise. Another constraint is that the oscillator must have a low enough duty cycle so that the peak power after amplification is high enough for efficient non-linear conversion in the harmonic generator 220. The oscillator 230 may be, for example, a short-pulse oscillator that produces infrared radiation at a wavelength near 0.91 microns for Neodymium-doped fiber amplifier 210 and a few milliwatts of power. Exemplary embodiments of oscillator 230 include pulsed, low-duty-cycle semiconductor lasers and mode-locked Nd:Glass or crystal lasers. Low duty cycle, short pulse (e.g. <100 ps) oscillators are typically used to provide sufficient peak power for existing harmonic generators.

One oscillator type is a mode-locked neodymium bulk crystalline or glass laser operating at the same transition as the Nd:Glass fiber 212. Mode-locked lasers can conveniently have a ratio of peak power to average power of 1000. Thus an amplified signal with a 1 Watt average power would have a 1 kilowatt peak power, which is adequate for efficient nonlinear conversion. Historically, mode-locked lasers have been difficult to maintain and operate. They typically require complex electronics and tight mechanical tolerances. Recently, it has become possible to make "passively mode-locked" lasers that are much simpler and more stable. Such "passively mode-locked" typically use Nd:YLF, Nd:Yttrium Vanadate, or Nd:Glass. Such a "passively mode-locked" laser may be used as oscillator 230.

Another possible type of device for oscillator 230 is a modulated semiconductor laser. Semiconductor lasers with a wavelength of 910 nm are available. Some of these lasers can be electrically pulsed to provide pulses as short as 100 psec ($10^{-10}$ sec), while maintaining an average power near 1 mW and peak power near 100 mW. Such a power level and duty cycle are approximately adequate for efficient conversion to blue light after amplification which would increase the average power to about 10 Watts and peak power to about 1 kW. Improvements in semiconductor laser technology may make this approach more competitive with mode-locked lasers.

It is also possible to use an externally modulated semiconductor laser as the oscillator 230. A semiconductor laser may be externally modulated using, for example, a waveguide modulator. Waveguide modulators may be faster than electrical pulsing of the semiconductor laser itself. Furthermore, waveguide modulators may provide better stability. In addition a passively Q-switched laser (PQSL) may be used as the oscillator 230. Examples of such PQSL having suitable repetition rate and pulse length characteristics are described in detail below.

2. Three Color Light Source for Display

A blue laser of the type described above with respect to FIGS. 2A and 2B can be incorporated into a three-color light source according to a second embodiment of the present invention. Although the following description describes a specific embodiment that uses such a source to generate blue light, other blue laser sources may be used without loss of generality.

Figure 5:
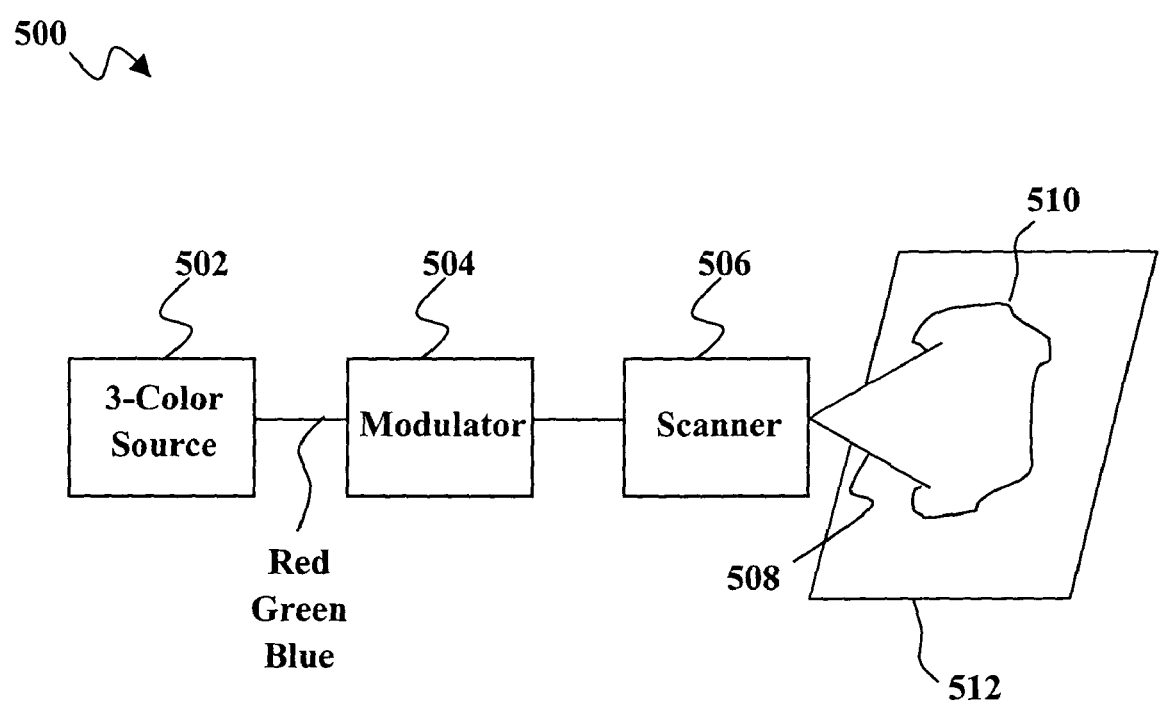
FIG. 5 depicts a simplified schematic diagram of a display system according to a fourth embodiment of the present invention.

FIG. 5 depicts a simplified schematic diagram of a display system 500 according to a fourth embodiment of the present invention. The system 500 generally comprises a three color source 502, and a scanning means 506 optically coupled to the source 502. The source 502 produces blue laser light as described above. The source 502 may produce green and red light by any suitable means. The source 502 may alternatively produce other color combinations of three or more colors, including blue.

The modulating means 504 modulates the intensities of the red, green, and blue light to produce different colors. For example, the light emerging from the source 502 may be split into three separate beams, each beam corresponding to a different color, through the use of wavelength selective beam splitters. The generation of different colors by mixing of three or more primary colors is well known in the art. Each of the three beams may be separately modulated and then recombined to form an output beam 508.

The scanner 506 produces an image 510 from the modulated output beam 508. The scanner may be coupled to the source 502 or the modulator 504. The scanner may raster scan the output beam 508 across a screen 512 in two dimensions in a manner having features in common with conventional video image generation. In a raster-scanned system, the modulator 504 modulates the power of a beam of output radiation, and a hi-speed scanning system rasters the beam across a screen. Alternatively the scanner 506 may produce an image line-by-line. A line-by-line system, creates a whole "line" of the display at a time, by spreading the light over a linear array of modulators. This line is then scanned across the screen 512 in only one dimension.

3. High Repetition Rate Passively Q-switched Neodymium Laser

The inventors have also developed a passively Q-switched laser (PQSL) suitable for use as the short pulse oscillator 230 in the laser 200, the source 412 in the blue laser of FIG. 4B, and/or as part of the three-color source 502 in the display system 500 and in other applications. Such a PQSL can provide single-frequency light near 914 nm with pulses with pulse length greater than zero but less than about 1.5 nanoseconds (nsec) and repetition rates greater than about 100 kHz, preferably greater than 1 MHz. As used herein, the term "single frequency" refers to a narrow frequency distribution centered in a single frequency. For practical purposes, a frequency distribution is sufficiently narrow if it is approximately Fourier transform limited.

The inventors have determined that short pulses are highly desirable because the high-power fiber amplifier 210 will suffer from the parasitic effect known as "Stimulated Brillouin Scattering" if the pulse length is greater than about 2 nsec. The inventors have determined that the Brillouin Scattering problem is greatly reduced if the pulse length is less than about 1.5 nsec.

A laser such as this operating at the wavelength of 1064 nm is also very useful. Such a laser could produce green light by frequency doubling, and it can also be used for laser radar. Such a laser design at 1064 nm is in the prior art, and is described e.g., by Spuhler et. al. in "Experimentally Confirmed Design Guidelines for Passively Q-Switched Microchip Lasers Using Semiconductor Saturable Absorbers," Journal of the Optical Society of America B, Vol. 16, No. 3, March 1999 (hereinafter Spuhler et al.). It is also known in the prior art that neodymium-doped yttrium orthovanadate ($Nd:YVO_4$) has 3 usable wavelengths of operation, 1064 nm, 1343 nm, and 914 nm.

Although the present PQSL design for a 914 nm laser uses the Spuhler design as a starting point, many changes over many parameters were required to make the PQSL operate as a useful source of 914-nm radiation. In their sum, optimizing these parameters required substantial effort on the part of the inventors and often involved counterintuitive optimization. For example, the electronic transition in $Nd:YVO_4$ giving rise to the 914-nm wavelength (specifically, the transition from the $^4F_{3/2}$ level to the $^4I_{9/2}$ level in Neodymium and referred to herein as the 914-nm transition) is far less forgiving than the 1064-nm transition of that material. This is partly because the gain of the 914-nm transition is about $\frac{1}{10}$ as strong as the 1064-nm transition. In addition, reabsorption loss due to population of the lower laser level (i.e., partially populated levels within a few kT of the ground state, where k is Boltzmann's constant and T is the absolute temperature of the laser material) is substantial. The inventors have optimized the many parameters in order to get a useful laser at the 914-nm wavelength. The values that were arrived at are not calculable from any theory, and were determined by an expensive and time-consuming process of multi-parameter testing. It was not apparent to the inventors a priori that there would be a solution, much less what the solution would be. Therefore, the existence of a solution and the nature of the problem were not known at the outset.

Figure 6A:
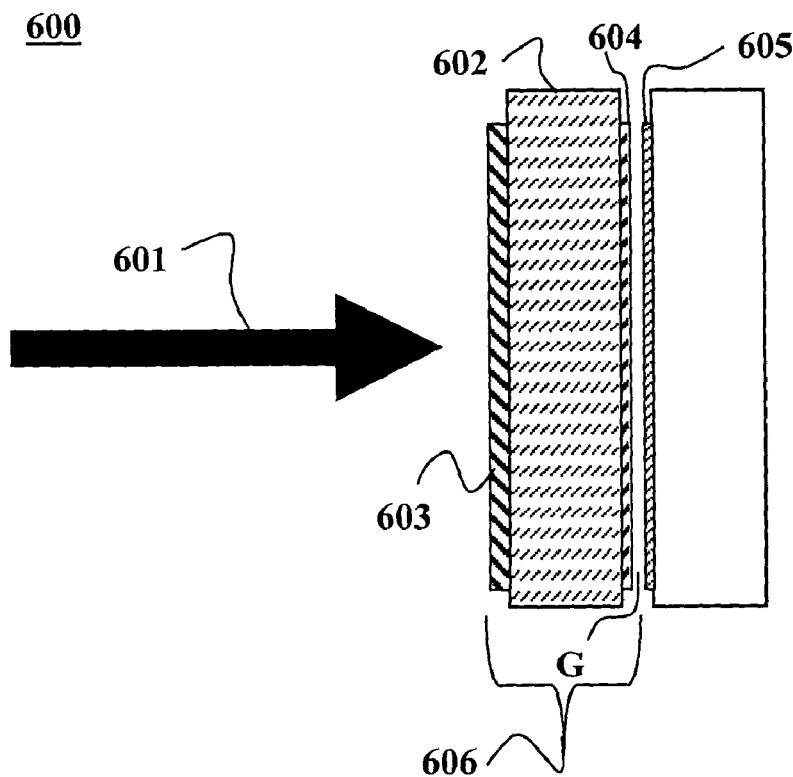
FIG. 6A depicts a schematic diagram of a passively Q-switched laser (PQSL) apparatus according to an embodiment of the present invention..

FIG. 6A is a schematic diagram of a PQSL apparatus 600 according to an embodiment of the invention. A beam of pumping radiation 601 is incident on a thin piece of neodymium-doped laser material 602. The laser material 602 has a first-surface 603 configured, e.g., with a suitable coating, such that the first surface 603 acts both to transmit the pump light and to create a resonant cavity for the PQSL apparatus 600. The configuration or coating of the first surface 603 affects the output coupling of the laser apparatus 600. A second surface 604 of the laser material 602 is configured (e.g., coated) to provide a low-loss anti-reflection coating at the 914-nm wavelength of the PQSL apparatus 600. A passive Q-switch 605 is optically coupled to the laser material 602 proximate the second surface 604. By way of example, a coated semiconductor may act as the passive Q-switch 605. In the example depicted in FIG. 6A the second surface 604 and the Q-switch 605 are separated by a narrow gap G. The coating on the first surface 603 and the coated semiconductor Q-switch 605 respectively act as the first and second reflecting surfaces of a resonant cavity 606.

Preferably, the neodymium-doped laser material 602 is neodymium-doped Yttrium Vanadate ($Nd:YVO_4$). Alternatively, the neodymium-doped laser material 602 may be another material such as Neodymium-doped Gadolinium Orthovanadate, (Nd:GdVO$_4$), Neodymium-doped Yttrium Lithium Fluoride (Nd:YLF), or Neodymium-doped Yttrium Aluminum Garnet Nd:YAG.

Figure 6B:
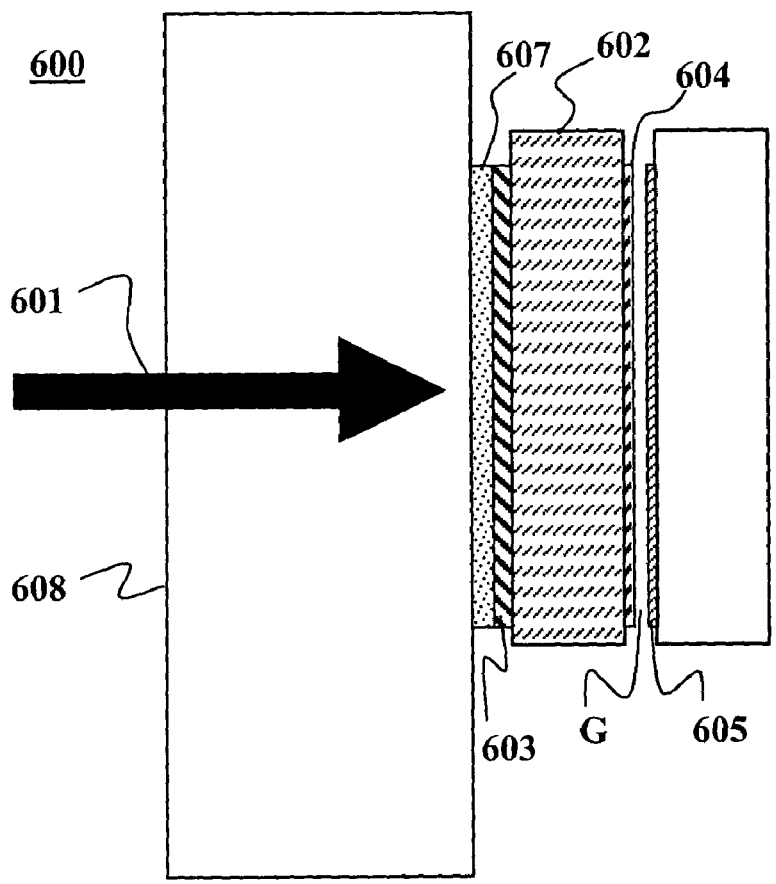
FIG. 6B depicts a schematic diagram of an alternative PQSL apparatus according to an embodiment of the present invention.

FIG. 6B shows a schematic diagram of the PQSL apparatus 600 with additional structure that may be associated with the thin piece of laser material. The laser material 602 may be bonded with a transparent adhesive 607 to a mounting block 608, which may be a thicker piece of transparent, high thermal conductivity material such as sapphire, silicon carbide, or yttrium aluminum garnet. The mounting block 608 provides structural support to the laser material 602 if it is very thin, and also allows heat to be transported from the laser material 602. Any coating on the first-surface 603 of the laser material 602, which is in contact with the adhesive, 607 should be designed with the index of refraction of the adhesive 607 taken into account. In addition, it is desirable that the adhesive 607 be heat-resistant.

The function of the Q-switch 605 is to provide an amount of loss that keeps the PQSL apparatus 600 from lasing most of the time, but which disappears once the PQSL apparatus 600 begins to lase, so that the PQSL can efficiently emit a powerful pulse after the loss is "saturated." Once the pulse is emitted, the Q-switch 605 returns to its lossy state.

Figure 7:
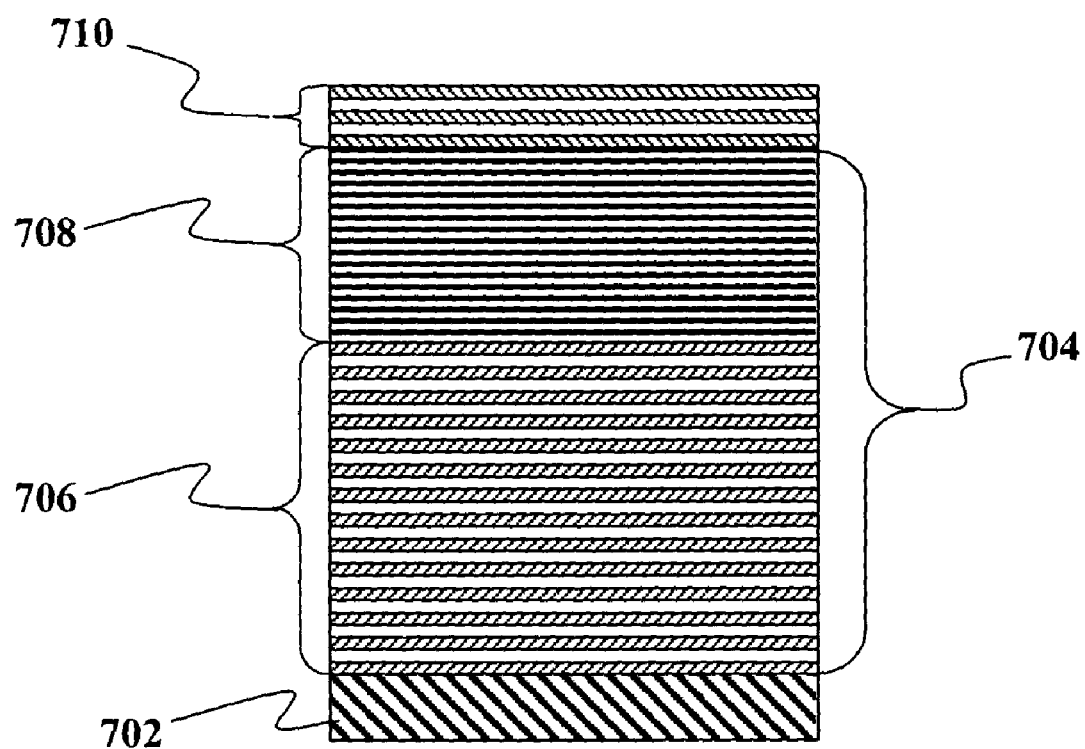
FIG. 7 depicts a schematic diagram of a saturable Bragg reflector (SBR) for use as a Q-switch in the apparatus of FIG. 6A or FIG. 6B.

FIG. 7 shows a possible design for the semiconductor passive Q-switch 605. The Q-switch 700 depicted in FIG. 7 is of a type known as a Semiconductor Bragg Reflector (SBR) or as a Semiconductor Saturable Absorber Mirror (SESAM). A substrate 702, serves as a support for epitaxial semiconductor layers 704. The substrate 702 may be a bulk semiconductor material e.g. Gallium Arsenide (GaAs). The epitaxial semiconductor layers 704 are generally compatible with semiconductor growth processes. The epitaxial semiconductor layers 704 include a semiconductor mirror stack 706, and quantum well stack 708. The epitaxial semiconductor layers 704 may also include a buffer layer between the substrate 702 and the semiconductor mirror stack 706.

The semiconductor mirror stack 706 contains alternating high and low refractive index layers. By way of example, the high refractive index layers may be epitaxial layers of Al$_x$Ga$_{1-x}$As (where x is between 0 and about 0.1). The low refractive index layers may be epitaxial layers of Al$_y$Ga$_{1-y}$As (where y is between about 0.9 and 1). Each of the high and low refractive index layers in the semiconductor mirror stack 706 has an optical thickness of about one-quarter of the wavelength of the laser radiation. The alternating high and low refractive index layers in the semiconductor mirror stack 706 create a highly reflective structure at the lasing wavelength.

The quantum well stack 708 can contain between about 3 and about 15 quantum wells. The quantum well stack 708 creates a loss at the wavelength of the laser radiation when low levels of laser radiation are present, but this loss greatly decreases, or "saturates," when high levels of light are present. The optical thickness of the quantum well stack 708 is generally an odd multiple of one-quarter wavelength ($\lambda/4$) of the laser radiation to achieve anti-resonance and insensitivity to layer thickness. A dielectric overcoat 710 serves to reflect as much as possible of the pump light, so that the pump light does not enter and saturate the quantum wells, and also reflects a chosen amount at the lasing wavelength, in order to keep the amount of lasing light in the quantum well to a desirable level that will not damage the semiconductor. The dielectric overcoat 710 generally has a reflectivity R that is greater than about 90% at the pump wavelength.

The SBR itself used in the Q-switch 700 may be based on a substrate of n-type GaAs. Layers of other semiconductors are grown on the substrate. By way of example, the semiconductor mirror stack 706 may include 60 layers consisting of 30 layer pairs of GaAs and AlAs, with each layer having an optical thickness of ¼ wave for laser radiation at a vacuum wavelength, e.g., of 914 nm. The quantum well stack 708 may have between 3 and 15 quantum wells (e.g., 9 to 12) with each quantum well made from a layer of absorbing material such as Indium Gallium Arsenide (InGaAs). Each quantum well is sandwiched between layers of non-absorbing material such as Gallium Arsenide Phosphide (GaAsP). In a particular embodiment the stoichiometric ratios of In, Ga, As, and P in these layers were GaAs$_{0.8}$P$_{0.2}$ and In$_{0.3}$Ga$_{0.7}$As respectively. The thickness of the InGaAs quantum-well layer was chosen to create photoluminescence at a vacuum wavelength of 930 nm±15 nm, and the thickness of the GaAsP was chosen to balance the strain between the absorbing quantum well layers and the non-absorbing barrier layers. In addition, the quantum well stack 708 may include one or more spacer layers of GaAs or InGaP to adjust the overall thickness of the quantum well stack 708 to an odd number of one-quarter wavelengths ($\lambda/4$) for radiation at a vacuum wavelength $\lambda$ of 914 nm. Each spacer layer can be placed between two barrier layers. If InGaP is used as a spacer material, the composition must be chosen so that the lattice of the InGaP matches that of GaAs, which requires 49% In and 51% P. The dielectric overcoat 710 above the epitaxial semiconductor layers 704 may include alternating layers of SiO$_2$ and HfO$_2$. The dielectric overcoat 710 can have between 87% and 96% reflectivity for the laser radiation, (e.g., at 914 nm vacuum wavelength) and >90% reflectivity for the pump radiation (e.g., at a vacuum wavelength of 809 nm).

Figure 8:
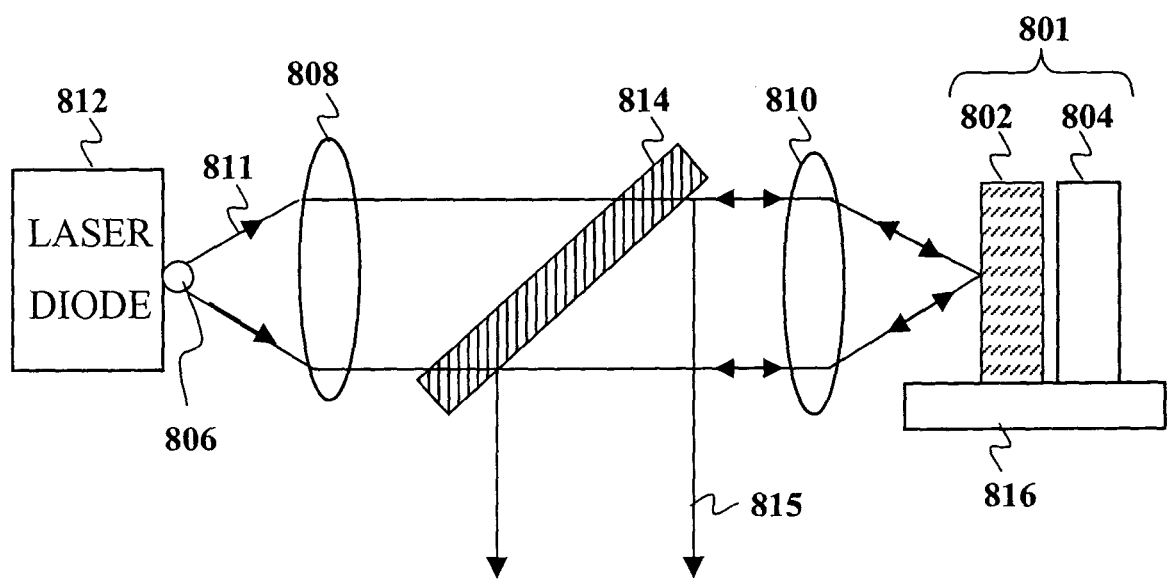
FIG. 8 depicts a schematic diagram of a PQSL according to an embodiment of the present invention.

FIG. 8 shows the overall structure of a PQSL 800 that incorporates apparatus of the type described in FIGS. 6A–6B and FIG. 7. The PQSL 800 generally includes a PQSL apparatus 801, like the PQSL apparatus 600 described above, having a laser material 802, and a Q-switch 804. The PQSL 800 further includes a laser diode 812, a fast axis collection lens 806, a collimating lens 808, and a focusing lens 810. A beamsplitter 814 may be disposed between collimating lens 808 and the focusing lens 810.

The laser diode 812 provides pump power in the form of pumping radiation 811 for the PQSL apparatus 801. The wavelength of pump radiation 811 from the laser diode 812 is typically about 810 nm. By way of example, the laser diode 812 may be a Model S-81-650C-50-C, with fiber lens, produced by Coherent Inc, of Santa Clara Calif. This particular laser diode puts out 0.65 Watts from a 0.05 mm aperture, and is collimated in one dimension by a cylinder lens attached by the manufacturer, which may serve as lens 806. Generally speaking, increasing the pump power increases the repetition rate. Repetition rates of 3 MHz have been achieved in embodiments of the present invention and higher repetition rates are believed to be achievable with higher power pump sources.

The laser material 802 may be of the type described above with respect to laser material 602 including first and second surface coatings as described above. By way of example, the laser material 802 may be Neodymium-doped Yttrium Orthovanadate (Nd:YVO$_4$), which is available from Castech, of Fujian, China, e.g., in 3 mm×4 mm×1 mm pieces, with the unique "c" axis parallel to the 4 mm axis. An output coupler may be coated onto the 3 mm×4 mm surface. The output coupler coating may be specified for 1% transmission at 914 nm and 95% transmission at 809 nm. After the output coupler coating is done, the Nd:YVO$_4$ part may be bonded to a sapphire carrier, and thinned down to 0.075 mm using standard grinding and polishing techniques. Then the polished surface may be anti-reflection coated for reflection less then 0.25% at 914 nm. The AR coating can be optimized for either of the two polarizations, and it is better if it is optimized for the same polarization that has the lowest output coupling. Both coatings on the Nd:YVO$_4$ may be subject to very high pulsed intensity, and the coating design must be chosen for high damage threshold.

The Nd:YVO$_4$ piece, may be bonded to a piece of sapphire for purposes of handling and heat removal. The Sapphire may be 1 mm thick, and oriented so that it will not significantly affect the polarization of the output of the laser. The sapphire is available from Esco products of Oak Ridge, N.J. The two parts may be bonded together with clear optical epoxy, such as Epotek 301, available from Epoxy Technology of Billerica, Mass. The surface of the Sapphire facing away from the Nd:YVO$_4$ (toward the laser diode 812) may be anti-reflection coated for the pump and lasing wavelengths. The other surface (the one with the epoxy) may be uncoated.

Lenses 806, 808, 810 collect the pump radiation from the diode 812 and focus it onto the laser material 802. The fast-axis collecting lens 806 is used when necessary to compensate for differing rates of divergence of the pump radiation as it emerges from the diode 812. Typically, the pump radiation diverges more rapidly along a fast axis than along a slow axis. The fast-axis collecting lens 806 reduces the divergence along the fast axis so that the beam of pump radiation diverges more uniformly. The fast-axis collecting lens 806 can be a fiber lens, or other lens with cylindrical symmetry, with an axis of cylindrical symmetry oriented perpendicular to the fast axis.

By way of example, the collimating lens 808 may be a model 350170-B from Lightpath Technologies of Orlando, Fl. This particular model of lens is a molded glass aspheric lens with a focal length of 6.16 mm and a N.A. of 0.30. The collimating lens 808 may be AR coated over the wavelength range 600 nm to 1050 nm. The focusing lens 810 may be a model 350150 from Lightpath Technologies of Orlando, Fl. This particular model of lens is a molded glass aspheric lens with a focal length of 2 mm and a N.A. of 0.50. The focusing lens 810 may be AR coated for <0.25% reflectivity at 914 nm.

The Q-switch 804 may be a SBR of the type described with respect to FIG. 7. The laser material 802 and the Q-switch 804 may be supported by a thermally-controlled structure 816. The structure 816 can expand or contract enough to adjust the laser resonator round trip length over more than one wavelength of the lasing radiation, allowing tuning of the laser wavelength to the point most likely to give powerful, single-frequency laser output.

The PQSL apparatus 801 generates laser output radiation 815 from the pumping radiation 811 as described above. The beamsplitter 814 transmits the pumping radiation 811 from the laser diode 812, while reflecting the laser output radiation 815 from the PQSL apparatus 801 away from the laser diode 812 so that laser output radiation 815 can exit the laser as a usable beam. The beamsplitter 814 may be a plano/plano optic designed for >95% transmission at 809 nm and greater than 95% reflection at 914 nm, at 45° incidence, for both polarizations of both the pumping radiation 811 and the laser output radiation 815. The beamsplitter 814 may be coated using standard coating techniques such as sputtering, vapor deposition and the like.

The embodiment depicted in FIG. 8 uses the beamsplitter 814 since the same surface of the laser material 802 serves as both an input coupler for the pumping radiation 811 and output coupler for the laser output radiation 815. Alternative embodiments of the present invention can avoid the use of a beamsplitter, e.g., if the Q-switch 804 is configured to also serve as an output coupler for the laser output radiation.

All optical components (e.g., the laser material 802, Q-switch 804, the lenses 806, 808, 810, laser diode 812, and beamsplitter 814) may be mounted using side-mount blocks. Side mounting is described in detail in commonly assigned U.S. Pat. Nos. 6,320,706 and 6,366,593, both of which are incorporated herein by reference. The Q-switch 804 (e.g., an SBR) may be aligned parallel to the laser material 802 (e.g., Nd:YVO$_4$,) with an air gap of less than 0.01 mm. Both the laser material 802 and Q-switch 804 may be mounted to the thermally controlled structure 816, e.g., an aluminum plate. The separation between the mounting points may be about 3 mm. This is enough distance that thermal expansion can be used to adjust the separation of the Q-switch 804 from the lasing material 802 by 1 or 2 microns with a temperature change of 20° or 30° C. A small thermo-electric cooler may control the temperature of the aluminum plate.

The basic PQSL design of FIGS. 6A–6B, 7 and 8 has features in common with conventional structures used previously to build PQSLs at the more commonly used and more easily optimized wavelength of 1064 nm. However, a multi-parameter optimization is needed to make the PQSL 800 of FIG. 8 operate as a useful 914 nm PQSL. As set forth above, a desirable PQSL for use in the laser 200 or display system 500 would preferably produce radiation at a wavelength of about 914-nm (corresponding to an electronic transition from the $^4F_{3/2}$ level to the $^4I_{9/2}$ level in Neodymium) in the form of pulses less than about 1.5 nsec in pulse length and greater than about 100 kHz in repetition rate. Table I lists the parameters which were studied and optimized.

TABLE I

Optimized Parameters

Neodymium concentration in the laser material, measured in %
Thickness of the laser material, measured in millimeters
Transmission of the first surface of the laser material at 914 nm, measured in %
Polarization selectivity of the coating on the first surface of the laser material
Intensity of pump radiation in the laser material, measured in Watts/mm$^2$
Semiconductor material for the substrate of the SBR
Semiconductor material of the high/low index layers of the semiconductor mirror
Semiconductor material for the quantum wells and for the material between them
Number of quantum wells in the SBR
Reflectivity of the dielectric overcoating at the pump & laser wavelength, measured in %

The following sections describe how each value was optimized, and what optimum value was found for each parameter. By way of example, in optimizing the parameters, Nd:YVO$_4$ was used as the laser material.

Neodymium Concentration in the Laser Material, Measured in %

Referring again to the PQSL apparatus 600 of FIG. 6A, the laser material 602 (e.g., Nd:YVO$_4$) is made very thin in order to provide short, single-frequency pulses. The primary disadvantage of using very thin pieces is that absorption of the pump light decreases. This can be shown very simply from theory. The obvious way to increase pump absorption is to increase the concentration of Neodymium (Nd).

Nd:YVO$_4$ is commercially available with Nd concentrations ranging from about 0.25% to about 3%.

Initially it was believed that simply increasing the Nd concentration in the laser material could optimize pump absorption. For example, U.S. Pat. No. 5,539,765 to Sibbett discusses making microchip lasers using the 913 nm transition in Nd:YVO$_4$. Sibbett teaches that a high doping of 3% is preferred because of the higher absorption. The lasers Sibbett describes do not use passive Q-switching. The inventors, by contrast, have determined that a high Nd concentration (e.g., 3%) leads to increased heating and reduced quantum efficiency due to a poorly understood process known as "upconversion." No theory guides what is the maximum Nd concentration. The inventors have found that for a usable PQSL, the doping concentration must be between 1% and 3% as measured in fractional substitution of Yttrium by Neodymium. For Nd:YVO$_4$, this is equivalent to a concentration of Nd of between about $1.3 \times 10^{17}$ atoms per mm$^3$ and $3.8 \times 10^{17}$ atoms per mm$^3$. In particular, for the purposes described herein, a Nd concentration of about 2% works particularly well.

Thickness of the Laser Material, Measured in Millimeters

In order to make a PQSL with the desired wavelength, pulse length and repetition rate, the thickness of the laser material is a critical parameter. There are two reasons to make the laser material 602 very thin. First, the pulses get shorter when the part gets thinner. Second, the PQSL will oscillate in a single frequency only if the resonator is so short that it supports only one mode of oscillation. The length of the resonator cavity is almost totally determined by the thickness of the laser material 602, since the Q-switch 605 and the air gap provide negligible thickness. As the laser material 602 gets too thin, however, pump absorption gets so small that the PQSL apparatus 600 is not useful. Usually, it is desired to absorb as much pump radiation as possible. However, the inventors have determined that a PQSL can operate effectively with the desired pulse length even if the lasing material 602 is so thin that it absorbs less than half of the pump radiation. In particular, the inventors have determined that the thickness of Nd:YVO$_4$ needs to be less than 0.1 mm in order to have a useful single-frequency PQSL at the desired pulse length of less than 1.5 nsec. The inventors obtained their best results at a thickness of about 0.075 mm. Although useful PQSLs were made with parts as thin as 0.056 mm, a minimum thickness was not experimentally determined, but it is presumably greater than zero.

Transmission of the First Surface of the Laser Material at 914 nm, Measured in %

Two opposite forces drive the choice of the transmission of the first surface 603 of the lasing material 602 at the lasing wavelength of about 914 nm, also known as the output coupling of the PQSL apparatus 600. A very low output coupling transmission is desirable in order to lower the threshold of lasing, so that the apparatus 600 will oscillate when pumped by available pump lasers. However, low output couplings will lead to a greater chance of optical damage in the laser, because the lasing light is trapped inside the resonator, which leads to higher levels of internally circulating power for a given level of output power. Such high internal circulating power levels can lead to serious problems of optical damage to both to the AR-coated second surface 604 of the laser material 602 and to the Q-switch 605. The inventors determined that to achieve lasing at all, the output coupling had to be below about 2%. At levels of about 0.5% and below serious problems of optical damage occurred. The best performance was achieved at about 1% output coupling.

Polarization Selectivity of the Coating on the First Surface of the Lasing Material A single polarization is desirable for frequency doubling of the laser output of the PQSL apparatus 600. The inventors have determined that it is possible to cause the PQSL apparatus 600 to lase in a single polarization by designing the output coupling so that there is slightly lower transmission for one polarization than for the other. Specifically, the polarization with the lower output coupling will lase. The inventors built a PQSL apparatus with output coupling of 0.94% for the ordinary polarization, and 0.98% for the extraordinary polarization. Only the ordinary polarization oscillated. Suitable coatings are available from MLD Optical Coatings of Mountain View, Calif. It is believed that for consistent single-polarization lasing, it is desirable to design coatings with the transmission split as much as possible. Fortunately, the high birefringence of Nd:YVO$_4$ makes it possible to design coatings with significant polarizing properties.

Intensity of Pump Radiation in the Nd:YVO$_4$, Measured in Watts/mm$^2$

The power in the pump beam divided by its cross-sectional area at the Nd:YVO$_4$ crystal is known as the pump intensity. Very high pump intensities are required even to get lasing at 914 nm, and even higher intensity is needed to achieve high repetition rate and short pulses. High pump intensity can be accomplished by using a laser diode pump source with high power output per unit length of the emitting aperture. High quality lenses may be used to focus the pump beam into a small spot. The desired performance could be obtained by focusing a 0.5-Watt pump beam into a circular area of radius about 0.02 mm. The pump intensity of such a system is typically greater than about 400 Watts/mm$^2$.

Semiconductor Material for the Substrate

Gallium Arsenide (GaAs) was used as the substrate material of the SBR, e.g., layer 702 of FIG. 7. In pieces of millimeter thickness, GaAs is poorly transmitting at 914 nm, which is why the first surface of the laser material was used as the output coupler. GaAs is a standard substrate for all of the ternary (three-element) materials that are used in the SBR design described above with respect to FIG. 7.

Semiconductor Material of the High/Low Index Layers of the Mirror

The structure which is placed on the GaAs first—and which is thus buried the deepest—is the semiconductor mirror stack 706 of alternating high and low refractive index layers of FIG. 7. For these alternating layers, GaAs followed by either AlAs or GaAlAs was used. Each layer had an optical thickness of ¼ wave at the laser wavelength of 914 nm, so that the stack as a whole is highly reflecting at 914 nm. It was determined that 30 layer pairs were sufficient to achieve >99% reflectivity of the stack.

Semiconductor Material for the Quantum Wells

Referring again to FIG. 7, the quantum well stack 708 was fabricated in the form of layers of In$_{0.3}$Ga$_{0.7}$As sandwiched between layers of GaAs$_{0.8}$P$_{0.2}$. Spacer layers were added to adjust the location of the quantum wells relative to the standing wave pattern. It is usually desirable to have the quantum wells located where the intensity of the standing wave pattern is a maximum. The spacer layers also adjust the overall optical thickness of the quantum well stack 708. The optical thickness of this structure as a whole is chosen to be an odd-integer number of quarter waves at 914 nm vacuum wavelength. The $In_{0.3}Ga_{0.7}As$ layers are known as "quantum wells" because their extreme thinness causes them to manifest quantum mechanical properties. The composition and thickness of these layers were chosen so that they have a photoluminescence peak at 930 nm±15 nm. The quantum wells provide the saturable absorption. These quantum wells absorb 914 nm light, creating loss at 914 nm which can raise the lasing threshold of the laser. Once lasing begins, the quantum wells absorb some of the 914 nm light and go into a non-absorbing state, that is, they are "saturated." At this point the laser suddenly finds itself well above threshold, since the loss disappears. The circulating optical power grows very quickly into a powerful Q-switched pulse.

The $GaAs_{0.8}P_{0.2}$ material has 2 purposes. First, it fills up space to separate the quantum wells and to keep the entire structure at an optical thickness of an odd multiple of one quarter of the wavelength of the laser output radiation. Second, it "strain balances" the $In_{0.3}Ga_{0.7}As$. This means that the tensile/compressive forces of a layer of one material are equal and opposite that to the other layer, so that no net strain builds up that could disrupt the epitaxial growth process.

Number of Quantum Wells

Spuhler et. al. describe how the repetition rate and pulse duration of the PQSL are determined by a quantity called $q_0$, which is the amount of saturable loss measured in per cent. A higher value of $q_0$ will lead to shorter pulses and lower repetition rate. For a given pulse length and repetition rate, one can use the Spuhler theory to quickly determine what value of $q_0$ is desired. However, knowing the desired value of $q_0$ by itself does not allow one to directly design the laser. The saturable loss parameter $q_0$ is a complicated function of the number of quantum wells, the exact position of each quantum well, and the reflectivity of the dielectric overcoating.

Reflectivity of the Dielectric Overcoating at the Lasing Wavelength, Measured in %

The dielectric overcoating 710 of FIG. 7 has 2 purposes. First, it serves to exclude 809 nm pump light from the semiconductor layers below it. Due to the small thickness of the laser material, about 50% of the pump light is transmitted all the way through the laser material and is incident on the SBR. This pump light could saturate the quantum wells 708 and reduce the effective value of $q_0$ in a large and unpredictable way.

The second purpose is to reduce the amount of Q-switched laser light in the semiconductor part of the Q-switch, in order to reduce damage due to high optical power. Most of the light in the air gap between the laser material and the Q-switch is reflected by the dielectric overcoating 710, and only a fraction enters the epitaxial semiconductor layers 704. This keeps the intensity in the epitaxial semiconductor layers 704 below the threshold for damage. The reduction in light in the semiconductor reduces the loss due to the quantum wells 708, since they see less light. Thus a larger number of quantum wells 708 are needed to get to the same level of $q_0$. A reflectivity of the dielectric stack at 914 nm between about 87% and about 96% was used. The net value of $q_0$ typically used was between about 0.2% and about 0.5%.

Figure 9:
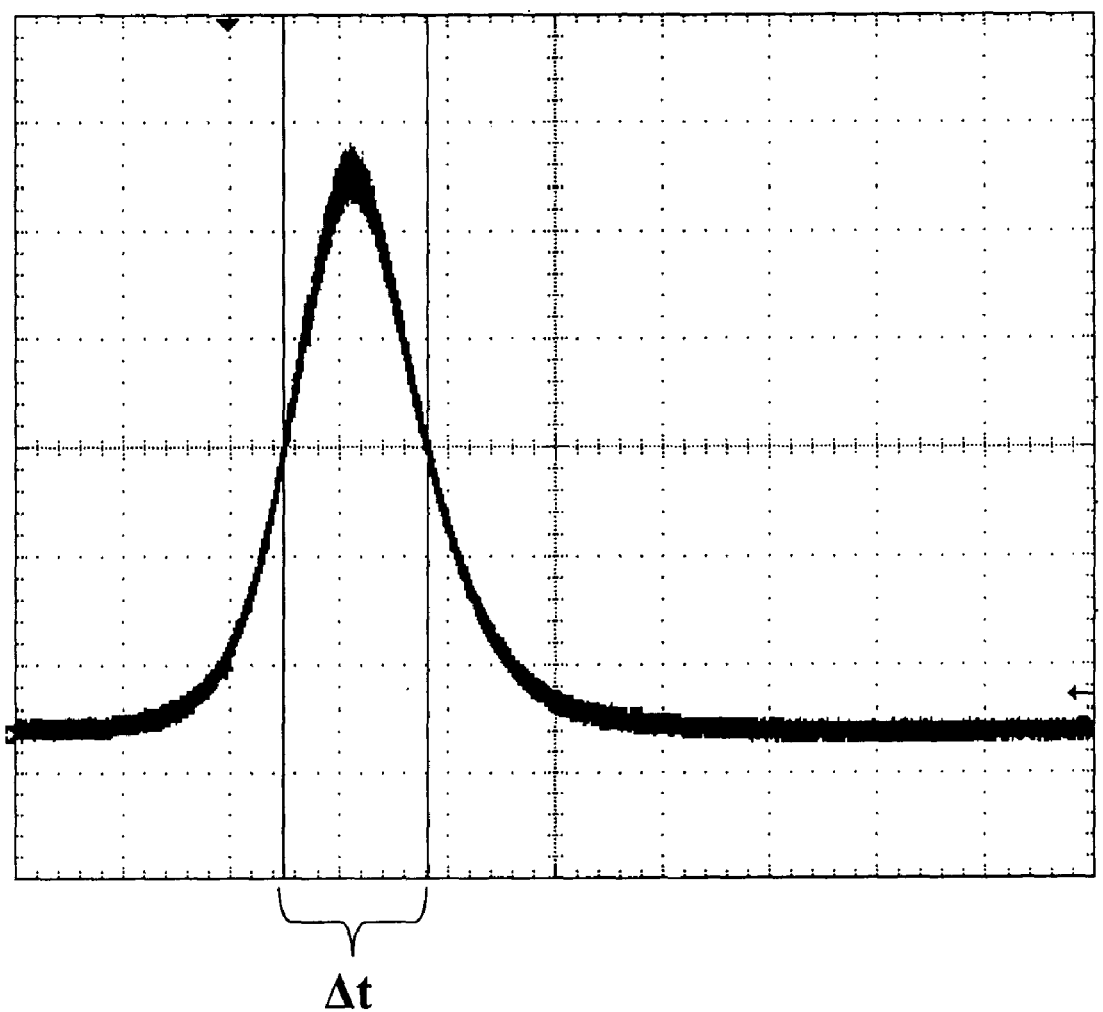
FIG. 9 depicts an oscilloscope trace showing a laser pulse produced by a PQSL according to an embodiment of the present invention.
Figure 10:
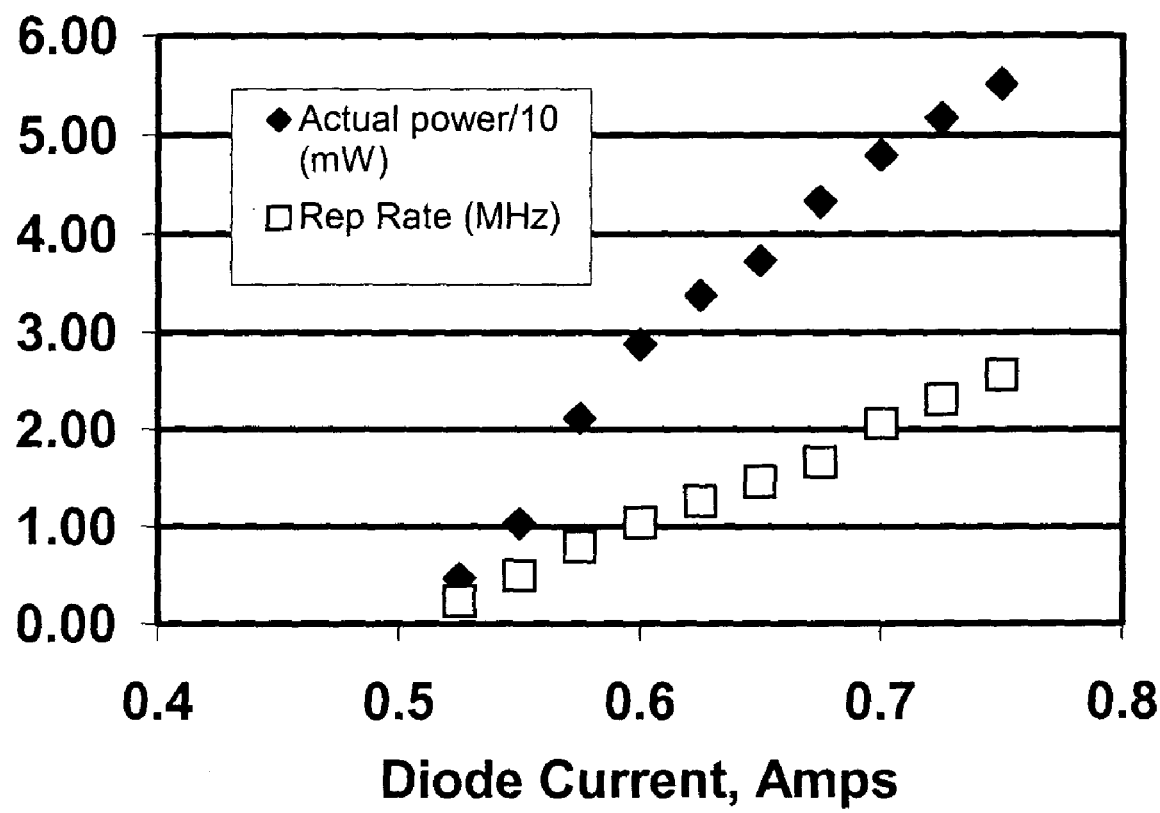
FIG. 10 shows a graph depicting plots of the power and repetition rate of a PQSL according to an embodiment of the present invention as a function of the current supplied to the pump diode.

The optimized laser met all of the design goals for a source of 914-nm radiation suitable for use in the blue laser 200 or display 500. FIG. 9 shows an oscillograph of a pulse from the PQSL, with a pulse length Δt of 1.32 nsec. FIG. 10 shows a graph of the power and repetition rate of a PQSL laser of the type depicted in FIG. 8 as a function of the current supplied to the pump diode. Over a wide range of pump currents the repetition rate exceeded the initial goal of 1 MHz.

Figure 11:
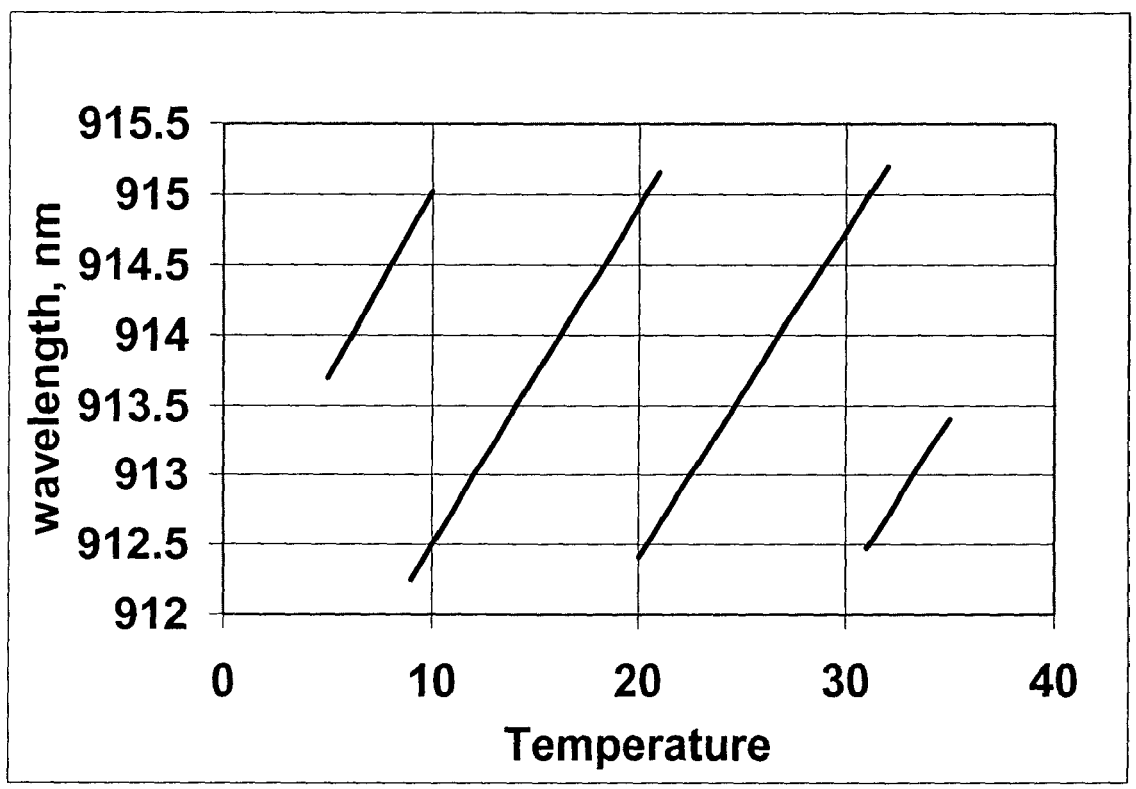
FIG. 11 depicts a graph of output wavelength versus temperature for lasers according to embodiments of the present invention.

Although reference is made herein to 914-nm as the wavelength corresponding to an atomic transition from the $^4F_{3/2}$ level to the $^4I_{9/2}$ level of Neodymium in a $Nd:YVO_4$ lasing material, the wavelength may vary depending on parameters such as temperature. For example, FIG. 11 shows the tuning of the laser caused by changing the temperature of the resonator platform. The different lines correspond to different modes of the laser. For some temperatures, the laser supports more than one mode. There are wide ranges of temperature that are single-frequency, and the wavelength can be tuned continuously by more than 1 nm. Furthermore, the atomic transition from the $^4F_{3/2}$ level to the $^4I_{9/2}$ level of Neodymium in other Neodymium-doped lasing materials may produce laser radiation at wavelengths other than 914 nm. As such, the scope of the invention is not limited to the 914-nm wavelength of the laser radiation.

It will be clear to one skilled in the art that the above embodiment may be altered in many ways without departing from the scope of the invention. Embodiments of the present invention that utilize fiber amplifiers can be much more efficient than competing techniques, since fiber amplifiers are very efficient. Temperature of pump diodes can be less critical since fiber amplifiers have loose tolerances on pump wavelength. The embodiments of the present invention can be implemented without water cooling since the more efficient system dissipates less heat and the tolerant pump wavelength specification generally requires less precise temperature control. Furthermore, fiber based systems can be made more compact since fiber can be wound up into a small volume.

Furthermore, applications of the PQSL apparatus described above are not limited to sources of blue light and color display systems. Another set of applications is in lasers used for fluorescence excitation. A high repetition rate is needed so that the light appears to be continuous on the time scale of the measurement process. Many other applications need blue light that is either continuous or which is at such a high repetition rate that it appears to be continuous. A 914 nm pulsed laser, with a high repetition rate but with pulses of less than 2 nsec duration, is a key component in such a blue system.

Another application is in laser radar systems. There are military applications for radar systems that provide a range-resolved image. Each pixel in such an image requires at least 1 pulse. Such systems need a high repetition rate in order to get a reasonably high pixel count at a reasonable refresh rate. With 100,000 pixels and a 10 Hertz refresh rate, and one pulse per pixel, a 1 MHz laser repetition rate is required. Short pulses are needed for good range resolution. A 2 nsec pulse gives range resolution of less than 1 foot, more than adequate for typical military targeting applications. The wavelength of 914 nm is in a useful window for military applications, since it is long enough to be totally invisible to the eye, and is thus more covert than visible systems, yet it is near the optimum wavelength for efficient detection by inexpensive, robust silicon detectors. Single-frequency operation allows for narrow spectral filtering of the return light, allowing more sensitive detection.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. The appended claims are not to be interpreted as including means-plus-function limitations, unless such a limitation is explicitly recited in a given claim using the phrase "means for."

What is claimed is:

1. A laser apparatus comprising:
   a Neodymium-doped lasing material,
      wherein the lasing material includes a first-surface that is substantially transparent to a pump radiation and substantially reflective to a laser radiation generated by an interaction between the pump radiation and the Neodymium-doped lasing material, and a second surface that transmits at least a portion of the laser radiation; and
      wherein the laser radiation is characterized by a vacuum wavelength corresponding to an atomic transition from the $^4F_{3/2}$ level to the $^4I_{9/2}$ level of Neodymium in the lasing material;
   a passive Q-switch optically coupled to the second surface of the lasing material;
      wherein the lasing material and the Q-switch are configured to produce pulses of the laser radiation;
      wherein the lasing material is Nd:YVO$_4$;
      wherein the pulses are characterized by a pulse length of greater than zero and less than about 1.5 nanoseconds and a pulse repetition rate greater than about 100 kHz; and
      wherein the Neodymium concentration in the lasing material is greater than about 1% and less than about 3%.

2. The apparatus of claim 1 wherein the Neodymium concentration in the lasing material is about 2%.

3. The apparatus of claim 1 wherein the lasing material is between about 50 microns thick and about 100 microns thick.

4. The apparatus of claim 1 wherein the first surface of the lasing material is configured to transmit between about 0.5% and about 2% of the laser radiation incident upon it from within the lasing material.

5. The apparatus of claim 4 wherein the first surface of the lasing material is configured to transmit about 1% of the laser radiation incident upon it from within the lasing material.

6. The apparatus of claim 5 wherein the first surface is configured to transmit about 0.94% of laser radiation of the ordinary polarization and about 0.98% of laser radiation of the extraordinary polarization.

7. A laser apparatus comprising:
   a Neodymium-doped lasing material, wherein the lasing material includes a first-surface that is substantially transparent to a pump radiation and substantially reflective to laser radiation generated by an interaction between the pump radiation and the Neodymium-doped lasing material, wherein the laser radiation is characterized by a vacuum wavelength corresponding to an atomic transition from the $^4F_{3/2}$ level to the $^4I_{9/2}$ level of Neodymium in the lasing material, the lasing material further having a second surface that transmits at least a portion of the laser radiation; and
   a passive Q-switch optically coupled to the second surface of the lasing material; and
   wherein the lasing material and the Q-switch are configured to produce pulses of the laser radiation;
   wherein the pulses are characterized by a pulse length of greater than zero and less than about 1.5 nanoseconds and a pulse repetition rate greater than about 100 kHz;
   wherein the Q-switch includes a saturable Bragg reflector (SBR);
   wherein the SBR includes a substrate, semiconductor mirror stack having alternating high and low refractive index layers, a quantum well stack having between about 3 and about 15 quantum wells, and a dielectric overcoat;
   wherein the semiconductor mirror stack is disposed between the substrate and the quantum wells;
   wherein the quantum well stack is disposed between the semiconductor mirror stack and the dielectric overcoat;
   wherein the dielectric overcoat includes alternating layers of SiO$_2$ and HfO$_2$; and
   wherein the dielectric overcoat has a reflectivity of between about 87% and about 96% at the wavelength of the laser radiation from the Neodymium-doped lasing material.

8. The apparatus of claim 7 wherein the dielectric overcoat has a reflectivity of greater than about 90% at the wavelength of the pump radiation.

9. A passively Q-switched laser (PQSL), comprising:
   a source of pump radiation;
   a Neodymium-doped lasing material, wherein the lasing material includes a first-surface that is substantially transparent to the pump radiation and substantially reflective to laser radiation characterized by an electronic transition from the $^4F_{3/2}$ level to the $^4I_{9/2}$ level of Neodymium in the lasing material, the lasing material further having a second surface that transmits at least a portion of the laser radiation; and
   a passive Q-switch optically coupled to the second surface of the lasing material;
   wherein the source of pump radiation, lasing material and Q-switch are configured to produce pulses of laser radiation characterized by a wavelength corresponding to an electronic transition from the $^4F_{3/2}$ level to the $^4I_{9/2}$ level;
   wherein the pulses are characterized by a pulse length of greater than zero and less than about 1.5 nanoseconds and a pulse repetition rate greater than about 100 kHz;
   wherein the lasing material is Nd:YVO$_4$; and
   wherein the Neodymium concentration in the lasing material is greater than about 1% and less than about 3%.

10. The PQSL of claim 9 wherein the Neodymium concentration in the lasing material is about 2%.

11. The PQSL of claim 9 wherein the lasing material is between about 50 microns thick and about 100 microns thick.

12. The PQSL of claim 9 wherein the first surface of the lasing material is configured to transmit between about 0.5% and about 2% of the laser radiation incident upon it from within the lasing material.

13. The PQSL of claim 12 wherein the first surface of the lasing material is configured to transmit about 1% of the laser radiation incident upon it from within the lasing material.

14. The PQSL of claim 13 wherein the first surface is configured to transmit about 0.94% of laser radiation of the ordinary polarization and about 0.98% of laser radiation of the extraordinary polarization.

15. An apparatus for producing blue light comprising:
   a neodymium-doped cladding-pumped fiber device for amplifying laser radiation;

an optical harmonic generator optically coupled to the fiber device for increasing a frequency of the laser radiation to produce a blue output radiation; and a passively Q-switched laser (PQSL) optically coupled to the neodymium-doped cladding-pumped fiber device, wherein the PQSL is configured to produce the laser radiation, the laser radiation having a harmonic that is blue, whereby the harmonic generator interacts with the laser radiation to produce blue light, wherein the PQSL includes:

a source of pump radiation;

a Neodymium-doped lasing material, wherein the lasing material includes a first-surface that is substantially transparent to the pump radiation and substantially reflective to laser radiation characterized by a by an electronic transition from the $^4F_{3/2}$ level to the $^4I_{9/2}$ level of Neodymium in the lasing material, the lasing material further having a second surface that transmits at least a portion of the laser radiation; and a passive Q-switch optically coupled to the second surface of the lasing material;

wherein the source of pump radiation, lasing material and Q-switch are configured to produce pulses of the laser radiation characterized by a wavelength corresponding to an electronic transition from the $^4F_{3/2}$ level to the $^4I_{9/2}$ level;

wherein the pulses are characterized by a pulse length of greater than zero and less than about 1.5 nanoseconds and a pulse repetition rate greater than about 100 kHz;

wherein the lasing material is Nd:YVO$_4$; and wherein the Neodymium concentration in the lasing material is greater than about 1% and less than about 3%.

16. The apparatus of claim 15 wherein the Neodymium concentration in the lasing material is about 2%.

17. The apparatus of claim 15 wherein the lasing material is between about 50 microns thick and about 100 microns thick.

18. The apparatus of claim 15 wherein the first surface of the lasing material is configured to transmit between about 0.5% and about 2% of the laser radiation incident upon it from within the lasing material.

19. The apparatus of claim 18 wherein the first surface of the lasing material is configured to transmit about 1% of the laser radiation incident upon it from within the lasing material.

20. The apparatus of claim 19 wherein the first surface is configured to transmit about 0.94% of laser radiation of the ordinary polarization and about 0.98% of laser radiation of the extraordinary polarization.

* * * * *